April 15, 1952 P. BAKKER 2,592,784

RESTRICTED SERVICE TELEPHONE SYSTEM

Filed Jan. 22, 1947 5 Sheets-Sheet 1

Inventor
Pier Bakker
By
Davis, Lindsey, Smith & Shonts
Attorneys

April 15, 1952 P. BAKKER 2,592,784

RESTRICTED SERVICE TELEPHONE SYSTEM

Filed Jan. 22, 1947 5 Sheets-Sheet 2

Inventor
Pier Bakker
By
Davis, Lindsey, Smith & Shonts
Attorneys

April 15, 1952 P. BAKKER 2,592,784

RESTRICTED SERVICE TELEPHONE SYSTEM

Filed Jan. 22, 1947 5 Sheets-Sheet 3

Inventor
Pier Bakker

By

Davis, Lindsey, Smith & Shonts

Attorneys

RESTRICTED SERVICE TELEPHONE SYSTEM

Filed Jan. 22, 1947 5 Sheets-Sheet 4

Inventor
Pier Bakker
By
Davis, Lindsey, Smith & Shonts
Attorneys

RESTRICTED SERVICE TELEPHONE SYSTEM

Filed Jan. 22, 1947 5 Sheets-Sheet 5

Inventor
Pier Bakker

By

Davis, Lindsey, Smith & Shonts

Attorneys

Patented Apr. 15, 1952

2,592,784

UNITED STATES PATENT OFFICE 2,592,784

RESTRICTED SERVICE TELEPHONE SYSTEM

Pier Bakker, Chicago, Ill., assignor to Automatic Electric Laboratories, Inc., Chicago, Ill., a corporation of Delaware Application January 22, 1947, Serial No. 723,525

8 Claims. (Cl. 179—18)

Figure 1:
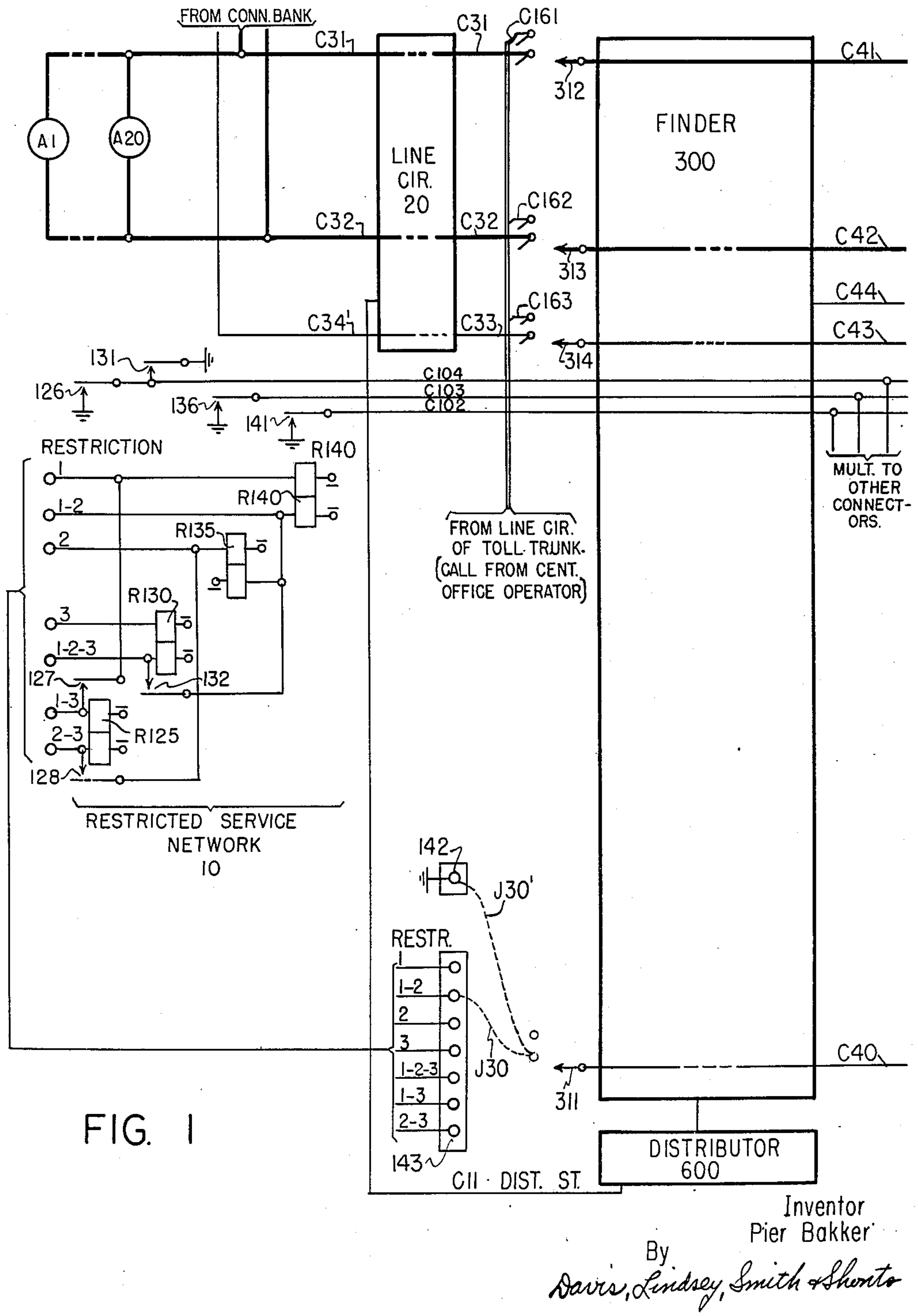

The present invention relates in general to automatic telephone systems and has for its principal object the provision of new and improved switching apparatus of the type known as mixed service connectors. As to certain features, this invention may be considered as improvements over the mixed service connectors disclosed in the copending applications of Clarence E. Lomax, Serial No. 702,846, filed October 11, 1946, now Patent No. 2,513,426, granted July 4, 1950, and of Imre Molnar, Serial No. 704,170, filed October 18, 1946, now Patent No. 2,524,131, granted October 3, 1950.

It is another object of the invention to provide in a system of the character noted, improved service restricting equipment which is controlled on an individual subscriber line basis and on an individual trunk group basis, and which is arranged to operate in order to impose the restriction individual to a calling subscriber line each time a trunk group is called.

It is another object of the invention to provide in a system of the character described, improved service restricting equipment which may be operated to impose one or more restrictions on any subscriber line of the system and thus prevent the calling subscriber from obtaining connection with any trunk in any of the trunk groups corresponding to the restrictions imposed.

It is a further object of the invention to provide in a system of the character described, improved service restricting equipment which includes a number of marking conductors corresponding respectively to the number of trunk groups accessible to the various subscriber lines of the system and which conductors are marked in accordance with the particular restriction imposed upon any calling subscriber line to prevent the selection of a trunk in a selected trunk group in the event the selected trunk group corresponds to the marked conductor.

One of the features of the invention relates to a novel relay arrangement whereby certain signals are transmitted to the subscriber lines involved in a telephone connection to indicate corresponding operating conditions of the switching apparatus included in the connection.

Another feature of the invention relates to novel arrangements whereby an audible tone signal is transmitted to a calling operator during one stage of the setting up of a connection to a busy called line, and whereby the audible tone signal and a visual signal are transmitted to a calling operator during the final stage of the setting up of a connection to a busy called line.

The invention both as to its organization and method of operation, together with other objects and features thereof, will best be understood by reference to the specification taken in connection with the accompanying drawings in which Figs. 1 to 5, inclusive, when arranged from left to right in consecutive order with the interconnecting lines in alignment, illustrate an automatic telephone system having incorporated therein certain of the features of the invention briefly referred to above.

Referring now more particularly to the drawings, Fig. 1 shows a party subscriber line terminating in a line circuit 20 which, in turn, is accessible to any one of a plurality of line finders, such as the line finder 300. The illustrated party line is common to twenty subscriber substations A1 to A20, inclusive, which are arranged for code ringing. It should be understood, however, that the system may be provided with ten party lines arranged for either bridged or divided code or harmonic ringing. In order to assign idle finders, such as the finder 300, to the use of calling lines, a distributor 600 is provided which is controlled in response to a call on any one of the lines to cause an assigned finder to find and connect with the particular calling line. The finder 300 is of the well known Strowger type employing a Strowger switching mechanism, the contact field of which is divided into ten vertical levels, and wherein each level includes ten radially disposed contacts, whereby each wiper of the wiper set comprising the wipers 311 to 314, inclusive, has access to one hundred individual bank contacts. The detailed circuits and the description of operation of the line circuit 20, the finder 300 and the distributor 600 are fully covered in the copending Lomax application, Serial No. 702,846, filed October 11, 1946. Accordingly, for the sake of brevity, these circuits are only schematically illustrated herein. However, attention is directed to the fact that while the finder 300 is illustrated as a one hundred line finder having only one set of wipers, a two hundred line finder of the type illustrated and described in said Lomax application may also be utilized.

A restricted service network 10 has also been provided whereby certain of the subscribers paying a lower service charge for their telephone service may be restricted from extending interexchange connections over certain of the groups of trunk lines which are accessible to the connector 200. This network 10 is common to all of the finder-connector links of the system and all of the lines upon which service restrictions are to be imposed. The network provides seven different combinations of restrictions on three different groups of trunks accessible to the connectors of the system. In brief, the network 10 comprises four relays which are adapted to be operated individually or in combination, depending upon the restriction imposed upon the calling subscriber line. These relays will prevent the connector included in a connection from seizing an idle trunk line in a group of trunks, in the event a particular calling subscriber is not entitled to make a call over the selected group of trunks.

The connector illustrated in Figs. 2 to 5, inclusive, has incorporated therein certain of the features of the invention briefly referred to above and is one of a plurality of such connectors which may be controlled by calling subscribers to complete local connections, to complete connections to any one of a plurality of automatic suboffices, or to complete connections to a toll operator at a central office. More specifically, the connector 200 is directly connected, by way of the conductors C40 to C44, inclusive, to the finder 300, thereby to form a finder-connector link. Accordingly, it will be understood that a like number of finders and connectors are provided in order to form sufficient finder-connector links to handle the telephone traffic in the illustrated telephone system. The connector 200 is of the Strowger type and is provided with a set of wipers comprising the wipers 581 to 584, inclusive. Each wiper has access to a contact field arranged in ten vertical levels and wherein each level includes ten radially disposed contacts, whereby each wiper has access to one hundred individual bank contacts. The wiper set is carried by a wiper shaft (not shown) which is movable step by step in a vertical direction under control of a vertical magnet 560, is movable step by step in a rotary direction under control of a rotary magnet 490, and is automatically restored to its normal starting or resting position under control of a release magnet 290. The connector 200 also comprises a minor switch 570 which includes the wipers 571 and 577 and their associated bank contacts, the minor switch stepping magnet 574 for driving the wipers one step in a clockwise direction in response to each energization thereof, and a minor switch release magnet 573 which, upon energization, causes the wipers 571 and 577 to be returned in a counterclockwise direction to their normal starting positions.

The first four lowermost levels of bank contacts accessible to the wipers 581 to 584, inclusive, are utilized to terminate four different groups of interoffice trunks interconnecting the telephone office containing the illustrated equipment with the outlying automatic suboffices and the central office. The tenth or uppermost level of bank contacts accessible to the above-mentioned wipers terminates the P. B. X or private branch exchange group of trunks. The fifth to the ninth levels of banks contacts accessible to the said wipers are utilized to terminate the various subscriber lines. Finally, in order to make full use of the bank contacts in the four lowermost levels which do not terminate trunk lines, the connector is arranged so that subscriber lines may be terminated on such contacts. With this arrangement the four lowermost levels of bank contacts may each terminate a separate group of trunks and each group may include any number of trunks from one to ten, inclusive. The levels in which less than ten trunks are utilized may also terminate subscriber lines, as noted above.

The connector 200 is also provided with a plurality of normal post contacts which are arranged to be operated in a predetermined manner when the wiper shaft (not shown) is elevated to the first, second or third level of bank contacts, and function in cooperation with the restricted service network 10 to prevent the connector 200 from seizing a trunk line in a selected group of trunks in the event the particular calling subscriber is restricted from extending calls over the particular selected group of trunks.

Figure 5:
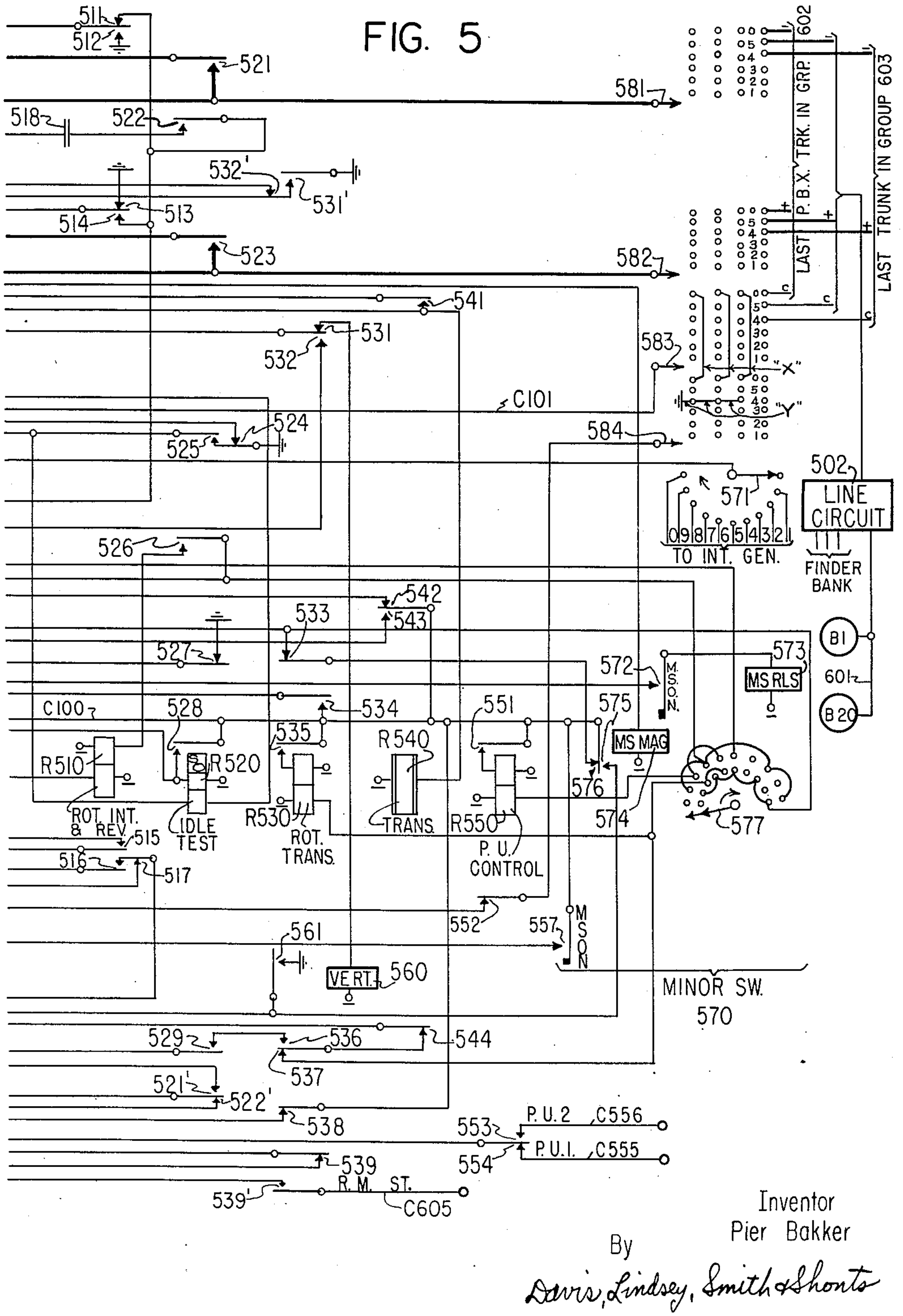

Fig. 5 also illustrates one of a plurality of subscriber lines accessible to the connector 200 by way of the line circuit 502 and the party line 601. This party line is common to twenty subscriber substations B1 to B20, inclusive, each of which may be signaled by the connector 200 in accordance with a predetermined ringing code signal. The line circuit 502 is also provided with three conductors which are terminated in the bank contacts of the various finders of the system, such as the finder 300, so that the substations B1 to B20, inclusive, may initiate calls in the same manner as the subscribers at substations A1 to A20, inclusive.

There is also disclosed in Fig. 5 one of a plurality of P. B. X trunks extending to a remote P. B. X switchboard (not shown). The illustrated P. B. X trunk 602 extends to a line circuit (not shown) which may be similar to the line circuit 20 and extends therefrom to the remote P. B. X switchboard. Furthermore, Fig. 5 illustrates one of a plurality of trunks extending to a central office (not shown). This trunk also terminates in a line circuit (not shown) which may be similar to the line circuit 20 and extends therefrom to the central office by way of the usual repeater networks. It should be understood that the three groups of trunks terminating respectively on the lowermost three levels of the connector bank contacts also extend to line circuits which are similar to the line circuit 20, and extend therefrom to the respective automatic suboffices (not shown) by way of the usual repeater networks. The manner in which the various line circuits and repeaters are connected and arranged has been illustrated and described in detail in the above-mentioned Lomax application and reference is made thereto for a complete understanding of the operation thereof.

DIRECTORY NUMBERING ARRANGEMENT

In order to facilitate understanding of the following detailed description of operation of the system, it is necessary to consider first the directory numbering scheme which is utilized in designating the various lines terminated in the bank contacts of the various connectors. For this purpose it will be arbitrarily assumed that each of the interoffice trunk groups terminating respectively on the first, second and third levels of the connector, the toll trunk group terminating on the fourth level of the connector, and the P. B. X trunk group terminating on the tenth level of the connector includes ten trunks. It should be uderstood, however, that if the trunk and toll traffic is insufficient to utilize the full complement of ten trunks in the respective groups, the number of trunks therein may be reduced accordingly. Consequently, if the traffic is sufficient to require the full complement of ten trunks in the respective groups, all vacant contacts included in any one of the first four levels of bank contacts may be utilized to terminate subscriber lines. Based on the foregoing consumption, the following directory numbers may be assigned to the subscriber lines of the different types and to the various trunk groups, but it should be noted that the indefinite character "X" may be any number from "1" to "9" and "0."

Single digit 7—
Interoffice trunks terminated in the first level of bank contacts of the connectors.

Single digit 8—
Interoffice trunks terminated in the second level of bank contacts of the connectors.

Single digit 9—
Interoffice trunks terminated in the third level of bank contacts of the connectors.

Single digit 0—
Toll trunks terminated in the fourth level of bank contacts of the connectors.

2011—
Private branch exchange trunks terminated in the tenth level of bank contacts of the connectors and arranged for selection through an automatic trunk hunting operation. For night service the individual P. B. X trunks may be selected by substituting the digit "3" for the first digit "2" and then dialing the remaining three digits in accordance with the individual trunk numbers.

251X to 259X and 250X, 351X to 359X and 350X—
Ten subscriber lines of the twenty party type terminated in the fifth level of bank contacts of the connectors.

261X to 269X and 260X, 361X to 369X and 360X—
Ten subscriber lines of the twenty party type terminated in the sixth level of bank contacts of the connectors.

271X to 279X and 270X, 371X to 379X and 370X—
Ten subscriber lines of the twenty party type terminated in the seventh level of bank contacts of the connectors.

281X to 289X and 280X, 381X to 389X and 380X—
Ten subscriber lines of the twenty party type terminated in the eighth level of bank contacts of the connectors.

291X to 299X and 290X, 391X to 399X and 390X—
Ten subscriber lines of the twenty party type terminated in the ninth level of bank contacts of the connectors.

From the above outline of the directory numbering scheme it will be noted that the directory numbers, differing only in the first digit thereof, may be utilized to designate the same subscriber line. For example, the first digit "2" or "3" determines that the particular called subscriber party line is to be signaled by either a first group of ten ringing codes or a second group of ten ringing codes, and the particular ringing code in the selected group is ultimately selected to signal the particular called subscriber on the selected party line in response to the dialing of the last digit of the subscriber directory number. Attention is directed to the fact that the digits "4" and "5" may be substituted in place of the digits "2" and "3," noted above, in the event that the operating telephone company decides that it is preferable for directory number identification to utilize first digits "4" and "5." The operation of the connector 200 is substantially identical when the first digits "4" and "5" are dialed as the operation thereof when the first digits "2" and "3" are dialed.

The second and third digits of any directory number dialed into one of the connectors effects respectively the vertical and rotary movement of the associated Strowger switch wipers. The fourth digit is used to effect the code selection and the side of the called subscriber line over which selected ringing code is to be transmitted during the ringing operation. More specifically, odd numbered fourth digits, when dialed into the connector following a first digit "2" or "3," serve to effect the selection of the corresponding code in the first or the second group of ten ringing codes and to select the negative side of the selected party line for ringing current transmission. Even numbered fourth digits, when dialed into a connector following a first digit "2" or "3," serve to effect the selection of the corresponding code in the first or second group of ten ringing codes and to select the positive side of the selective party line for ringing current transmission.

LOCAL CALLS

In considering the operation of the system to set up a connection, it will be assumed that the subscriber at substation A1 desires to extend a connection to a called subscriber at substation B1. When the handset provided at the calling substation A1 is removed from its supporting hook or cradle a circuit is completed for controlling the line circuit 20, and the latter circuit initiates the operation of the distributor 600 over the distributor start conductor C11. The distributor 600, in turn, having preselected an idle finder, such as the finder 300, initiates the operation of the finder to find and select the contacts in its contact bank terminating the conductors C31, C32 and C33 of the calling party line. More specifically, as soon as the finder 300 is started by the distributor 600 a temporary loop circuit, including the conductors C41 and C42, is completed for energizing the line relay R270 in the connector 200. Also, the finder 300 applies ground potential to the conductor C43, whereupon the connector 200 is controlled in the manner to be described below. When the conductors C31 to C33, inclusive, are engaged by the wipers 312 to 314, inclusive, of the finder 300, the finder switches through in a well known manner and extends the calling subscriber loop circuit from the line circuit 20 by way of the conductors C31 and C32, the wipers 312 and 313 and the conductors C41 and C42 to the windings of the line relay R270 in the connector 200. For a more detailed explanation of the operation of the line circuit 20, the distributor 600 and the finder 300, reference should be made to the above-mentioned Lomax application.

Referring now to the connector 200 illustrated in Figs. 2 to 5, inclusive, it will be noted that when the above-mentioned temporary loop circuit is completed by the finder 300 the line relay R270 is energized over a circuit which may be traced from ground by way of the contacts 423 and 532', the lower winding of relay R270, the contacts 324, 372 and 263 to the conductor C42, and then over the previously mentioned loop circuit, and returning by way of the conductor C41, the contacts 261, 371 and 321, and the upper winding of the relay R270 to battery. It will also be noted that when the finder 300 applies ground potential to the conductor C43 a circuit is completed, by way of the contacts 313' and 374, the vertical off-normal contacts 382 and the winding of the seizure relay R410 to battery. The relay R410, upon operating, at its contacts 413, connects the wiper 583 of the connector 200 by way of the conductor C101 and the contacts 413 to the winding of the busy relay R350. This circuit is ineffective at the present time inasmuch as the wipers of the connector 200 have not been positioned into engagement with the associated bank contacts. The relay R270 operates when the previously traced loop circuit is completed and, at its contacts 273, completes a circuit including ground at the contacts 346 for operating the lock-pulse relay R280. Upon operating, the lock-pulse relay R280, at its contacts 283, completes a holding circuit for itself which includes the resistor 284 and the contacts 273. Furthermore, at its contacts 282, the relay R280 completes a circuit for operating the release control relay R310, which may be traced from ground by way of the contacts 222 and 282 and the winding of the relay R310 to battery. In response to the operation of the release control relay R310, at its contacts 314′, it applies direct ground potential to the conductor C43 by way of the contacts 434, and it applies resistance ground potential thereto by way of the lower winding of the control relay R360. The latter relay is short-circuited at this time and does not operate. Also, at its contacts 315′, the relay R310 completes an operating circuit for the release control slave relay R340; and, at its contacts 312′, it completes a multiple locking circuit for itself, which includes the contacts 272 and ground at the contacts 222. Upon operating, the release control slave relay R340, at its contacts 344, applies ground potential to the conductor C100, thereby to complete a locking circuit for the lower winding of the seizure relay R410 which includes the resistor 448 and the contacts 452′. As a further result of the application of ground potential to the conductor C100, a circuit is completed by way of the contacts 538, 437 and 522′ for operating the dial tone and pickup relay R420. Also upon operating, the release control relay R310, at its contacts 313′, interrupts a point in the previously traced initial operating circuit for the upper winding of the relay R410, but this relay remains in its operated position over the previously mentioned locking circuit including its lower winding. Referring again to the operation of the release control slave relay R340, at its contacts 345, it applies ground potential to the timer and tone start conductor C339, thereby to initiate operation of the timer and tone machine (not shown) and, at its contacts 347, it completes a circuit whereby the timer controls the operation of the timing relay R210 by way of the timer start conductor C295, in a manner to be described hereinafter. Also, the relay R340, at its contacts 346, interrupts a point in the previously traced initial operating circuit for the lock-pulse relay R280, but this relay remains in its operated position over the previously mentioned locking circuit including the resistor 284 and the contacts 283 and 273. The resistance value of the resistor 284 is such that the relay remains in its operated position but is just on the verge of restoring to normal. Referring to the dial tone and pickup relay R420, at its contacts 423, it disconnects ground potential from the lower winding of the line relay R270 and, simultaneously therewith, at its contacts 422, it completes a circuit for transmitting a dial tone signal to the calling subscriber. This circuit may be traced from ground by way of the winding of the dial tone transformer 437, the contacts 422 and 532′, the lower winding of the line relay R270, and the previously traced path including the conductor C42 to the calling subscriber line.

When the finder 300 finds the calling line and switches through, in the manner mentioned above, the calling subscriber loop circuit, including the conductors of the calling line, the line circuit 20, the conductors C31 and C32, and the wipers 312 and 313, is extended through the finder 300 to the conductors C41 and C42 of the connector 200. Furthermore, the direct ground potential applied to the control conductor C43 by the finder 300 is removed therefrom and the conductor C43, which is now grounded from the contacts 434 of the connector, is extended by way of the wiper 314 and the conductor C33 to the line circuit 20. In response to the last-mentioned operation ground potential applied to the conductor C43 by the connector 200 maintains the finder 300 in its operated position and causes the operation of the cutoff relay (not shown) in the line circuit 20. The last-mentioned relay marks the calling party line as busy to the connectors having access thereto. As soon as the calling subscriber line is switched through in the manner mentioned above, the dial tone signal is heard by the calling subscriber and indicates that the dialing of the called subscriber number may be initiated.

*Dialing the first digit*

When the connector 200 is seized and conditioned for further operation, in the manner described above, the relays R270, R280, R310, R340, R410 and R420 are in their operated positions. Assuming that the directory number designating the desired called subscriber substation B1 is "2543," the first digit dialed by the calling subscriber at substation A1 will comprise two impulses. Consequently, when the calling subscriber actuates the dial of his telephone instrument in accordance with the first digit "2," the impulse springs thereof interrupt the loop circuit including the windings of the line relay R270 and it momentarily restores to normal two times. The first time the line relay R270 restores, at its contacts 272, it interrupts a point in the previously traced multiple holding circuit for the release control relay R310; at its contacts 271, it completes a preenergizing circuit for its upper winding, which includes ground at the contacts 222, the contacts 271, the resistor 285, and the contacts 311′, whereby the line relay R270 will be quickly reoperated when the loop circuit is closed at the end of the first impulse; and finally, at its contacts 273, it interrupts a point in the previously traced holding circuit for the lock-pulse relay R280, thereby to cause the latter relay to restore quickly.

When the lock-pulse relay R280 restores to normal, at its contacts 282, it interrupts the remaining point in the previously traced circuit for the release control relay R310, but due to the slow-to-release characteristics of the latter relay it remains in its operated position during pulsing. At its contacts 283, the relay R280 opens a further point in its locking circuit and, finally, at its contacts 281, it completes a circuit for energizing the minor switch stepping magnet 574 in multiple with the transfer control relay R540. This circuit may be traced from ground by way of the contacts 222, 281 and 341, one path including the contacts 442 and the winding of the minor switch stepping magnet 574 to battery, and the other path extending by way of the contacts 433 and the winding of the transfer control relay R540, to battery. Thus, it will be seen that upon the first restoration of the line relay R270 the lock-pulse relay R280 restores to normal and it, in turn, completes an operating circuit for the transfer control relay R540 and the minor switch stepping magnet 574.

The transfer control relay R540, upon operating, at its contacts 541, completes a holding circuit for itself which is independent of the contacts 433, thereby to maintain itself in its operated position during pulsing. As a further result of its operation, the relay R540, at its contacts 543, completes a multiple holding circuit for the dial tone and pickup relay R420 by way of the grounded conductor C100 and the contacts 543 and 428.

The minor switch stepping magnet 574, upon operating, advances its wipers 571 and 577 one step in a clockwise direction into engagement with the first contacts in the associated banks and, in addition thereto, at its contacts 575, it applies ground potential from the conductor C100 to the conductor C369 in order to prepare a circuit for reenergizing the lock-pulse relay R280 as soon as the line relay R270 is reoperated at the end of the first pulse. In view of the fact that the restoration of the lock-pulse relay R280 causes the operation of the minor switch stepping magnet 574, the latter magnet can not be restored to normal until the line relay R270 and the lock-pulse relay R280 are subsequently operated. As soon as the wipers 571 and 577 of the minor switch 570 are advanced from their normal resting positions, the minor switch off-normal contacts 557 and 572 are closed, the former contacts completing an operating circuit for the minor switch off-normal relay R430 from the grounded conductor C100, and the latter contacts preparing a point in the circuit for subsequently controlling the minor switch release magnet 573. Consequently, the relay R430 immediately operates when the minor switch off-normal contacts 557 are closed, thereby to interrupt, at its contacts 433, a point in the initial operating circuit for the transfer control relay R540. The latter relay, however, remains operated during impulsing over the previously mentioned circuit, including the contacts 541. Also, at its contacts 437, the relay R430 interrupts a point in the multiple circuit for the dial tone and pickup relay R420, but this relay remains in its operated position until the end of the dialing of the first digit of the called subscriber number. As a further result of the operation of relay R430, at its contacts 436, it removes the shunt circuit from around the lower winding of the control relay R360. As soon as the above-mentioned shunt circuit is removed, the relay R360 operates over a circuit including the conductor C43 and the winding of the cutoff relay (not shown) in the line circuit 20. As a further result of its operation the relay R360, at its contacts 367, completes a locking circuit for itself which includes its upper winding and the grounded conductor C100. Also, at its contacts 364, the relay R360 applies direct ground potential to the conductor C43 and thereby again places a shunt circuit around its lower winding. The relay R360, however, remains in its operated position as a result of the locking circuit including its upper winding.

At the end of the first pulse the impulse springs of the dial at the calling subscriber substation are reclosed in order to complete again the loop circuit for reenergizing the line relay R270. Since the upper winding of the relay R270 has been preenergized, it immediately operates to control again the previously traced circuits by way of its contacts 272 and 273, thereby to reenergize the release control relay R310 and to reoperate the lock-pulse relay R280. The lock-pulse relay R280 upon reoperating, at its contacts 281, interrupts the previously traced circuit for the minor switch stepping magnet 574, which now restores to normal, and to interrupt the previously traced circuit for the transfer control relay R540. At its contacts 282, the relay R280 completes a further point in the circuit for reenergizing the release control relay R310; and, finally, at its contacts 283, it completes the previously traced locking circuit for itself. When the minor switch stepping magnet 574 restores, at its contacts 575, it disconnects the initial operating ground potential from the conductor C369, thereby to render effective the above-mentioned locking circuit for the lock-pulse relay R280. Subsequent impulses transmitted to the line relay R270 control the lock-pulse relay R280, the slow-to-release release control relay R310 and the transfer control relay R540, and the minor switch stepping magnet 574, in the same manner as has been described above. Since the first digit dialed by the calling subscriber at substation A1 is the digit "2" the minor switch wipers 571 and 577 are positioned into engagement with the second contacts in the associated contact banks, and the line relay R270 and the lock-pulse relay R280 are retained in their operated positions at the end of the second impulse of the digit "2." Shortly after the last impulse of the digit "2" the slow-to-release relay R540 restores to normal, and its contacts 543, interrupts a further point in the multiple holding circuit for the dial tone and pickup relay R420. The relay R420 now restores to normal and, at its contacts 422, disconnects the dial tone signal from the calling subscriber loop circuit and substitutes, at its contacts 423, a direct ground potential in order to maintain the line relay R270 in its operated position. Also, at its contacts 427, the relay R420 completes an operating circuit for the upper winding of the vertical transfer relay R440, which may be traced from the grounded conductor C100 by way of the contacts 542, 444, 427 and 435, and the upper winding of the relay R440, to battery. Upon operating the vertical transfer relay R440, at its contacts 446, completes a locking circuit for its lower winding which includes the contacts 454' and the grounded conductor C100; at its contacts 442, it disconnects the impulsing circuit for the minor switch stepping magnet 574; and, at its contacts 443, it connects the impulsing circuit to the winding of the vertical magnet 560. Finally, at its contacts 444, the relay R440 interrupts a point in the initial energizing circuit for its upper winding and prepares, at its contacts 445, a point in a circuit traced hereinafter for controlling the circuit of the rotary disconnect relay R450.

In view of the foregoing it will be understood that as a result of the dialing of the first digit "2" the minor switch wipers 571 and 577 are positioned into engagement with the second contacts in their associated contact banks and the vertical transfer relay R440 is operated in order to transfer the impulsing circuit from the minor switch stepping magnet 574 to the vertical magnet 560. The connector 200 is now in condition to respond to the second digit of the called subscriber directory number dialed by the calling subscriber at substation A1.

Before discussing further operation of the connector 200 as a result of the dialing of the second digit of the called subscriber number, a further explanation will be given of the operation thereof in the event that the first digit dialed is the digit "3." If the first digit dialed is the digit "3" the relays R270 and R280 operate, in the manner previously described, to transmit three impulses to the minor switch stepping magnet 574, thereby to advance the wipers 571 and 577 into engagement with the third contacts in the associated contact banks. In this position the wiper 577 prepares a point in the circuit for the lower winding of the pickup control relay R550. However, the circuit for energizing the relay R550 is not completed until after the second digit has been dialed into the connector 200, as will be subsequently explained. In the event the first digit dialed into the connector 200 is the digit "4" the operation thereof is the same as has been described above when the calling subscriber dials the digit "2," with the exception that the wipers 571 and 577 of the minor switch 570 are positioned into engagement with the fourth contacts in the associated contact banks. Finally, in the event that the first digit dialed into the connector 200 is the digit "5," the operation thereof is the same as when the first digit dialed is the digit "3," with the exception that the wipers 571 and 577 of the minor switch 570 are positioned into engagement with the fifth contacts in the associated contact banks.

*Dialing the second digit*

When the second digit "5" of the called subscriber directory number is dialed by the calling subscriber at substation A1, the line relay R270 and the lock-pulse relay R280 cooperate in the manner previously described, whereupon five impulses are now transmitted to the vertical magnet 560 and, in multiple therewith, to the transfer control relay R540. This circuit may be traced from ground by way of the contacts 222, 281 and 341, one branch extending by way of the contacts 443 and 531 and the winding of the vertical magnet 560 to battery, and the other branch extending by way of the contacts 451 and the winding of the transfer control relay R540 to battery. The latter relay upon operating, at its contacts 541, completes a multiple circuit for itself, which is independent of the contacts 451, and thus remains in its operated position during impulsing. As a further result of the operation of the transfer control relay R540, at its contacts 542, it interrupts a point in the initial energizing circuit for the upper winding of the vertical transfer relay R440, but the latter relay remains in its operated position over the previously traced locking circuit including its lower winding. Finally, the relay R540, at its contacts 544, interrupts a point in a circuit, traced hereinafter, for the rotary transfer relay R530, in order to prevent the latter relay from operating until the last impulse of the second digit has been transmitted to the vertical magnet 560. The vertical magnet 560 operates over the above-traced circuit, and, at its contacts 561, applies ground potential to the conductor C369 in order to prepare a point in the circuit for energizing the lock-pulse relay R280 as soon as the line relay R270 reoperates at the end of the first impulse. When the lock-pulse relay R280 is reoperated at the end of the first impulse, at its contacts 281, it interrupts the previously traced circuits for the transfer control relay R540 and the vertical magnet 560. The vertical magnet 560 now restores to normal but due to its slow-to-release characteristics the transfer control relay R540 remains in its operated position. Upon restoring the vertical magnet 560 removes ground potential from the conductor C369, at its contacts 561, whereupon the lock-pulse relay R280 locks itself in series with the resistor 284, in the manner previously described. Incident to the operation of the vertical magnet 560 the wiper shaft (not shown) is advanced one step in a vertical direction to position the wipers 581 to 584, inclusive, opposite the first level of the associated bank contacts. As soon as the wiper shaft is moved in a vertical direction away from its normal resting position the vertical off-normal contacts 291, 381 and 419 are closed and the vertical off-normal contacts 382 are opened. When the vertical off-normal contacts 291 are closed a point in the circuit is prepared for controlling the Strowger release magnet 290. When the vertical off-normal contacts 382 are opened a point in the initial energizing circuit for the seizure relay R410 is interrupted, but this relay is retained in its operated position over the previously traced locking circuit, including its lower winding. Finally, when the vertical off-normal contacts 419 are closed a point in the circuit for controlling the rotary transfer relay R530 is prepared but the circuit cannot be completed until the end of the fifth impulse of the second digit "5" transmitted to the connector 200, at which time the transfer control relay R540 restores to close its contacts 544.

Each time the vertical magnet 560 is energized in response to the restoration of the lock-pulse relay R280 during impulsing it advances the wipers of the connector 200 an additional step in the vertical direction until, at the conclusion of the fifth impulse, the wipers 581 to 584, inclusive, are positioned opposite the fifth levels of their associated contact banks. Also, at the conclusion of the fifth impulse of the digit "5" the line relay R270 and the lock-pulse relay R280 are retained in their operated positions Shortly after the last impulse of the digit "5" has been transmitted to the transfer control relay R540, it restores to normal and, at its contacts 544, completes the previously mentioned circuit for controlling the rotary transfer relay R530 This circuit may be traced from ground by way of the vertical off-normal contacts 419, 436, 544 and 537 and the lower winding of the relay R530, to battery. Upon operating, the relay R530, at its contacts 535, completes a locking circuit for its upper winding which includes the grounded conductor C100; also upon operating, at its contacts 537, it interrupts the initial energizing circuit for its lower winding. As a further result of the operation of relay R530, at its contacts 532', it disconnects the ground potential applied to the lower winding of the line relay R270 by way of the contacts 423 and, at its contacts 531', it substitutes a holding ground potential for the lower winding of the relay R270. Furthermore, at its contacts 531, the relay R530 transfers the impulsing circuit from the vertical magnet 560 to a circuit, traced hereinafter, for controlling the rotary magnet 430. At its contacts 534, the relay R530 completes an operating circuit for the minor switch release magnet 573, which may be traced from the grounded conductor C100 by way of the contacts 534, 458, 235 and 317', the minor switch off-normal contacts 572 and the winding of the minor switch release magnet 573, to battery.

When the abovementioned circuit is completed the release magnet 573 attracts its associated holding pawl (not shown), thereby to permit the wipers 571 and 577 to be automatically restored in a counterclockwise direction to their illustrated normal positions. Incident to the restoration of the wipers 571 and 577 to their normal resting positions, the minor switch off-normal contacts 572 are opened in order to interrupt the above-mentioned circuit for the release magnet 573 which now restores to normal, and the minor switch off-normal contacts 557 are opened in order to interrupt the previously traced circuit for the minor switch off-normal relay R430 which also restores to normal. As a further result of the operation of the rotary transfer relay R530, at its contacts 539', it applies ground potential by way of the contacts 465' to the ringing machine start conductor C605, thereby to initiate the operation of the ringing apparatus (not shown).

In the foregoing description of operation of the connector 200 during the dialing of the second digit "5" it was assumed that the wipers of the minor switch 570 were positioned into engagement with the second contacts of the associated contact banks in response to the dialing of the first digit "2." As a result thereof, at the end of the dialing of the second digit "5," and upon the restoration of the transfer control relay R540, the rotary transfer relay R530 was operated and the minor switch off-normal relay R430 was restored incident to the restoration of the wipers of the minor switch 570 to their normal positions. In the event that the wipers of the minor switch 570 are in engagement with the third contacts of their associated contact banks in response to the dialing of a first digit "3," the rotary transfer relay R530 and the pickup control relay R550 will be operated in parallel when the transfer control relay R540 restores at the end of the second digit "5" dialed into the connector. The circuit for operating the relays R530 and R550 may be traced from ground by way of the off-normal contacts 419, the contacts 436, 544 and 537, one branch extending by way of the lower winding of the relay R530 to battery, and the other branch extending by way of the third contacts in the bank bridged by the wiper 577 of the minor switch 570 and the lower winding of the relay R550, to battery. The relay R530 locks itself to the grounded conductor C100 by way of its contacts 535, and the relay R550 locks itself to the grounded conductor C100 by way of its contacts 551. In response to the operation of the relay R530 the minor switch release magnet 573 is operated in order to restore the wipers 571 and 577 to their normal resting positions and the minor switch off-normal relay R430 is restored to normal, in the manner previously described. The relay R550, upon operating, at its contacts 554, disconnects the PU-1 conductor C555 and, at its contacts 553, connects the PU-2 conductor C556. Accordingly, the transfer accomplished, at the contacts 553 and 554, insures that the second group of ten ringing codes will be connected to the ten contacts terminating in the bank of the minor switch 570 associated with the wiper 571 instead of the first group of ten ringing codes, as is the case when the relay R550 remains in its normal position. The manner in which the PU-1 conductor and the PU-2 conductor transmit pulses to the dial tone and pickup relay R420 will be described hereinafter, since the latter circuit cannot be completed until the particular called line has been selected and found to be idle.

It will be recalled that the minor switch off-normal relay R430 restored to normal incident to the opening of the minor switch off-normal contacts 557 and, as a result thereof, as its contacts 435, it interrupts a point in the initial operating circuit for the upper winding of the vertical transfer relay R440, but the latter relay remains in its operated position over the locking circuit including its lower winding. At its contacts 436, the relay R430 interrupts a further point in the previously traced circuit for the lower winding of the rotary transfer relay R530, which relay also remains in its operated position over the locking circuit including its upper winding. Following the operations described above, the connector 200 is conditioned to respond to the impulses of the third digit "4" of the directory number of the called subscribed at substation B1.

*Dialing the third digit*

When the third digit "4" of the called subscriber directory number is dialed by the calling subscriber at substation A1, the line relay R270 and the lock-pulse relay R280 cooperate in the manner previously described, whereupon four impulses are transmitted to the rotary magnet 490 and, in multiple therewith, to the transfer control relay R540. It may be well to mention at this time that just prior to the transmission of the impulses constituting the digit "4," the relays R270, R280, R310, R340, R360, R410, R440 and R530 are in their operated positions. When the line relay R270 and the lock-pulse relay R280 restore at the beginning of the first pulse, a circuit is completed from ground by way of the contacts 222, 281 and 341, one branch extending by way of the contacts 433 and the winding of the transfer control relay R540 to battery, and the other branch extending by way of the contacts 443, 532, 453 and 234, and the winding of the rotary magnet 490 to battery. The transfer control relay R540 operates in response to the above-traced circuit and, at its contacts 541, completes a multiple circuit for itself, which is independent of the contacts 433, and thus remains in its operated position during pulsing. Also, at its contacts 542, the relay R540 opens a point in a circuit, traced hereinafter, for controlling the rotary disconnect relay R450. The rotary magnet 490 operates when the above-traced circuit is completed and rotates the wiper shaft (not shown) in a well known manner to advance the wipers 581 to 584, inclusive, of the connector 200 into engagement with the first set of contacts in its associated fifth level. Also, upon operating the rotary magnet 490 applies ground potential to the conductor C369 in order to cause the reoperation of the lock-pulse relay R280 as soon as the line relay R270 operates at the end of the first impulse, in the manner previously described. The circuit for grounding the conductor C369 may be traced from ground by way of the vertical off-normal contacts 419, the contacts 416, 457' and 491 and the conductor C369. As soon as the line relay R270 and the lock-pulse relay R280 reoperate the impulsing circuit for controlling the rotary magnet 490 is interrupted and the magnet restores to normal. Upon restoring, at its contacts 491, the rotary magnet 490 removes ground potential from the condutor C369, whereupon the lock-pulse relay R280 is locked in its operated position over the circuit including the resistor 284. As a further result of the operation of the rotary magnet 490, at its contacts 492, it interrupts a point in the incomplete circuit for controlling the lower winding of the rotary interrupter and reversing relay R510. This circuit, however, is not effective in the present call since it is only utilized when it is necessary automatically to rotate the wipers of the connector 200 during a trunk hunting operation.

Each time the line relay R270 and the lock-pulse relay R280 restore, a pulse is transmitted in the manner described above in order to control the rotary magnet 490 and to advance the wipers an additional step in the rotary direction so that, at the conclusion of the digit "4," the wipers stand in engagement with the fourth set of contacts in the selected level. In the present case it will be assumed that the contacts engaged by the wipers 581, 582 and 583 terminate respectively the negative, positive and C conductors extending to the line circuit 502 individual to the called party line 601. Furthermore, each time the rotary magnet 490 is operated it completes, at its contacts 491, the above-mentioned circuit for controlling the reenergization of the lock-pulse relay R280. As soon as the wiper shaft (not shown) is rotated away from its normal rotary position, the rotary off-normal contacts 480 are closed in order to prepare a point in the incomplete circuit for the rotary disconnect relay R450.

As soon as the wipers 581 to 583, inclusive, of the connector 200 engage the contacts terminating the conductors of the called line a test is made to determine whether or not the particular called line is idle or busy. If the called line is busy ground potential is applied to the bank contact engaged by the C wiper 583 and a circuit is thereby completed for operating the busy test relay R350. This circuit may be traced from the busy marking ground potential encountered by the C wiper 583, the conductor C101, the contacts 413 and the winding of the busy test relay R350 to battery. The relay R350 operates and, at its contacts 355, it prepares a point in a locking circuit for itself, whereby the relay R350 is maintained in its operated position after the seizure relay R410 restores, in the manner to be described hereinafter. In the event that the called line is idle when the wipers 581 to 583, inclusive, engage the contacts of the called line, a battery potential is encountered by the C wiper 583, thereby to prevent the above-described operation of the busy test relay R350.

Shortly after the last impulse of the third digit "4" has been transmitted to the transfer control relay R540, the relay restores to normal and, at its contacts 542, now completes the previously mentioned circuit for operating the rotary disconnect relay R450. This circuit may be traced from the grounded conductor C100 by way of the contacts 542, 445 and 456, the rotary off-normal contacts 480, and the winding of the relay R450 to battery. Upon operating the rotary disconnect relay R450 completes a locking circuit for itself which includes the grounded conductor C100 and its contacts 459. Also upon operating, at its contacts 456, the relay R450 interrupts a point in its initial operating circuit; at its contacts 453, it disconnects the previously traced impulsing circuit for the rotary magnet 490; at its contacts 452′, it interrupts the locking circuit for the seizure relay R410, which now restores to normal; and, at its contacts 454′, it interrupts a point in the locking circuit for the lower winding of the vertical transfer relay R440, thereby to cause the latter relay to restore to normal. As soon as the seizure relay R410 restores to normal it completes, at its contacts 412, a circuit whereby the lower winding of the idle test relay R520 is connected to the C wiper 583 of the connector 200. This circuit may be traced from ground by way of the contacts 524, 342, 356 and 232, the lower winding of the idle test relay R520, the contacts 412, the conductor C101 and the C wiper 583 which now stands in engagement with the contact in its associated contact bank terminating the C conductor extending to the line circuit 502 of the idle called line. Incident to the restoration of the vertical transfer relay R440, at its contacts 443, it interrupts a further point in the previously described impulsing circuit for controlling the rotary magnet 490 and, at its contacts 442, it recompletes the previously mentioned impulsing circuit for controlling the minor switch stepping magnet 574, whereby the latter magnet may be controlled by the last digit dialed by the calling subscriber.

If the called line is busy when the C wiper 583 engages the called line, the ground potential applied thereto will have caused the operation of the busy test relay R350, in the manner described above, and, consequently, upon the restoration of the seizure relay R410 the above-traced circuit for the lower winding of the idle test relay R520 is ineffective to cause operation thereof. As a further result of the restoration of the seizure relay R410, at its contacts 413 and 414, it transfers the initial operating circuit for the busy test relay R350 from the circuit, including the grounded C wiper 583, to a circuit which includes the contacts 355 and 342 and ground potential at the contacts 524. Thus the busy test relay R350 is now maintained in its operated position over a locking circuit which is independent of its initial energizing circuit. As a further result of the operation of the busy test relay R350, at its contacts 351, it prepares a point in a circuit for transmitting a busy tone signal to the calling subscriber but this circuit cannot be completed until the calling subscriber has dialed the final digit of the called subscriber directory number.

If the particular called line is idle when the C wiper 583 engages the associated bank contact, the busy test relay R350 will remain in its restored position and, upon the restoration of the seizure relay R410, the above-traced circuit including the contacts 412 is completed for operating the idle test relay R520. Upon operating the relay R520, at its contacts 528, completes a locking circuit for its upper winding which includes the grounded conductor C100. Also upon operating the relay R520, at its contacts 521 and 523, prepares points in the circuit whereby the ringing signal is subsequently transmitted by way of the wipers 581 and 582 to the called subscriber line. At its contacts 525, the relay R520 applies direct ground potential to the C wiper 583 over a circuit which includes the contacts 412 and the conductor C101, thereby to mark the particular called line as busy to all other connectors having access thereto. At its contacts 529, the relay R520 applies ground potential to the motor start conductor C606 by way of a circuit which includes ground at the vertical off-normal contacts 419, the contacts 436, 544, 536, 529 and 466′, thereby to initiate operation of the motor generator apparatus for generating ringing current. Finally, at its contacts 521′, the relay R520 prepares a further point in the circuit whereby the dial tone and pickup relay R420 may be subsequently controlled by way of the PU-1 conductor C555. The connector 200 is now in condition to respond to the fourth digit "3" of the called subscriber number regardless of whether the called line is busy or idle.

*Dialing the fourth digit*

When the connector is ready to respond to the fourth and final digit of the called subscriber number the relays R270, R280, R310, R340, R360, R450 and R530 are in their operated positions and, in addition thereto, the busy test relay R350 or the idle test relay R520 will be operated, depending upon the busy or idle condition of the called line. When the calling subscriber at substation A1 dials the fourth digit "3" designating the particular ringing code assigned to the called substation B1, the line relay R270 and the lock-pulse relay R280 function in the manner previously described, whereby three current pulses are transmitted to the minor switch stepping magnet 574 and, in multiple therewith, to the transfer control relay R540. The magnet 574 operates in the manner previously described in connection with the dialing of the first digit of the called subscriber directory number and advances its wipers 571 and 577 into engagement with the third contacts in the associated contact banks. Each time the magnet 574 operates, at its contacts 575, it applies ground potential to the conductor C369 in order to reoperate the lock-pulse relay R280 as soon as the line relay R270 is operated at the end of each impulse. Incident to the off-normal movement of the wipers 571 and 577, the minor switch off-normal contacts 572 and 557 are reclosed, the former to prepare a point in the incomplete circuit for operating the minor switch release magnet 573 and the latter to complete the previously traced operating circuit for the minor switch off-normal relay R430.

Shortly following the last impulse of the fourth digit "3" the transfer control relay R540 restores and, at its contacts 542, completes a circuit for reoperating the vertical transfer relay R440, which may be traced from the grounded conductor C100 by way of the contacts 542, 444, 427 and 435, and the upper winding of the relay R440 to battery. Upon operating the relay R440 completes a locking circuit for its lower winding which may be traced from the grounded conductor C100 by way of the minor switch off-normal contacts 557, the contacts 454′ and 446. Also upon operating, at its contacts 444, the relay R440 interrupts the initial energizing circuit for its upper winding and, at its contacts 445, it completes a circuit for operating the upper winding of the rotary interrupter relay R510 in the event the last digit dialed is an even numbered digit and the called line is idle, but this circuit is not completed in the event the last digit dialed is an odd numbered digit or in the event the called line is busy.

Referring again to the operation of the minor switch off-normal relay R430, which relay operated as soon as the wipers of the minor switch 570 moved off normal during the dialing of the last digit, and assuming that the called line is busy, at its contacts 432, it completes a circuit for transmitting the busy tone signal to the calling subscriber line. When the called line is busy it will be recalled that the busy test relay R350 is in its operated position and, consequently, the busy tone signal is now transmitted from the busy tone conductor C318′ by way of the tone condenser 327, the contacts 331, 351 and 432, the condenser 378, the contacts 371 and 261, and the conductor C41 included in the loop circuit extending to the calling subscriber substation. The resulting busy tone signals serve to inform the calling subscriber at substation A1 that the desired connection cannot be obtained at the present time. In view of the foregoing it will be understood that the connector 200 operates to transmit a busy tone signal to the calling subscriber when a busy called line is encountered after the fourth or last digit of the called subscriber directory number has been dialed. Upon hearing the busy tone signal the calling subscriber should replace his receiver upon the associated switchhook in order to release the switching apparatus involved in the connection thus far established. The manner in which the connector is restored to normal in response to the release by a calling subscriber will be described hereinafter.

Before discussing further operation of the connector when the called line is idle, it is noted that when the wiper 571 of the minor switch 570 is in engagement with the third contact in its associated contact bank, the third ringing code transmitted by the ringing apparatus is extended by way of the wiper 571 to the make contacts 424 of the dial tone and pickup relay R420. This ringing current is not applied to the busy called line inasmuch as the circuit for controlling the relay R420 cannot be completed from the PU-1 conductor C555 when the idle test relay R520 remains in its restored position. In this manner the ringing current is prevented from being transmitted to the called subscriber line when the same is busy. Inasmuch as the final digit dialed into the connector 200 is the digit "3" and the wipers of the minor switch 570 are in engagement with the third contacts in their associated contact banks, the rotary interrupter relay R510 cannot be operated at the present time to reverse the connection of the ringing circuit to the called line, assuming that the particular called line is idle, but the idle test relay R520 is in its operated position. Since the first digit dialed into the connector 200 is the digit "2," the pickup control relay R550 is in its restored position and the PU-1 conductor C555 will now be connected to the winding of the dial tone and pickup relay R420. A ground pulse is transmitted over the PU-1 conductor C555 by the ringing interrupter, not shown, just preceding the time when the complete ten different ringing codes of the first group of ringing codes are applied to the ten different bank contacts accessible to the wiper 571 of the minor switch 570. With this arrangement the dial tone and pickup relay R420 will be operated to complete a ringing circuit to signal the called subscriber at a time when a full complement of the particular selected ringing code may be transmitted thereto, and this prevents mutilation or partial transmission of any particular selected ringing code. The circuit for operating the relay R420 extends from the grounded PU-1 conductor C555 by way of the contacts 554, 448, 425′, 463′ and 521′, and the winding of the relay R420 to battery. As has been mentioned above, the pickup pulse on the PU-1 conductor C555 occurs just prior to the beginning of each of the available ten ringing codes in the first group of ten ringing codes. On the other hand, if the pickup control relay R550 is in its operated position the ground pulse for controlling the operation of the relay R420 will be applied to the PU–2 conductor C556, whereby the ten codes of a second group of ten ringing codes, which are different from the codes of the first-mentioned group, are applied to the ten ringing conductors connected to the bank contacts accessible to the wiper 571 of the minor switch R570.

The dial tone and pickup relay R420 operates when the ground pulse is received over the PU–1 conductor C555 and, at its contacts 424′ and 425′, it completes a locking circuit for itself which includes the grounded hold conductor C418 and simultaneously interrupts its initial energizing circuit, including the grounded PU–1 conductor C555. Ground potential is maintained upon the hold conductor C418 by the ringing interrupter during a ringing cycle and, at the end of each ringing cycle, ground potential is removed therefrom in order to restore the relay R420 to normal and thus transfer its control back to the PU–1 conductor C555. Upon operating the relay R420 also completes, at its contacts 424, a circuit for transmitting the selected ringing code to the called subscriber party line and, at its contacts 421, it completes a circuit for transmitting a ring-back tone signal to the calling subscriber. More particularly, when the contacts 424 are closed the selected third ringing code signal of the first group of ten ringing codes is transmitted by way of the wiper 571, the contacts 424, the winding of the ring cutoff relay R470, the contacts 511, 461 and 521 and the wiper 581 which is in engagement with the contact terminating the negative conductor of the called party line 601 to the grounded ringers at the various substations on the party line connected to the negative line conductor. The ringers at the various substations connected to the negative line conductor respond to the ringing code transmitted over the above-traced circuit but since the selected code is indicative of a call to the subscriber at substation B1, the subscriber thereat answers the call by removing his receiver from the associated telephone switchhook. Attention is directed to the fact that, in the event the particular subscribers on the party line are provided with bridged ringers, then the ringing code signal which is transmitted over the negative line conductor would return over the positive line conductor by way of the wiper 582, the contacts 523, 465 and 513, to ground.

Before describing the operation of the connector 200 in response to the answering of a call by the subscriber at substation B1, attention is directed to the fact that at the end of each ringing code cycle the dial tone and pickup relay R420 is restored to interrupt the ringing circuit, at its contacts 424, and to apply a resistance battery potential, comprising the winding of the rotary magnet 490, by way of the contacts 425 to the negative conductor of the called subscriber line in order to discharge the ringing condensers included in the substation circuits of each of the subscribers on the called line. Furthermore, in order to indicate to the calling subscriber at substation A1 that the called subscriber is being signaled, a portion of the ringing code is transmitted over a ring-back tone circuit which includes the contacts 522, the condenser 518, the contacts 463, 421 and 332, the condenser 378, the contacts 371 and 261 and the conductor C41 to the calling subscriber.

When the called subscriber at substation B1 answers the call a direct current bridge circuit is established between the negative and positive conductors of the called party line 601 in order to terminate the transmission of the selected ringing code signal. This circuit may be traced from ground by way of the contacts 513, 465 and 523, the wiper 582, the direct current bridge circuit, including the positive and negative conductors of the called party line 601, and returning by way of the wiper 581, the contacts 521, 461 and 511, the winding of the ring cutoff relay R470 and, depending upon whether the pickup relay R420 is in its operated or unoperated position, the circuit is either extended by way of the contacts 424 and the wiper 571 to the battery connected ringing generator or by way of the contacts 425 and the winding of the rotary magnet 490, to battery. More specifically, if the called subscriber answers the call during a silent period of the ringing code cycle, the circuit for operating the ring cutoff relay R470 will include the winding of the rotary magnet 490, but this magnet will not operate in series with relay R470. However, if the called subscriber answers the call during a ringing period of the ringing code cycle, the ring cutoff relay R470 will be operated over the circuit including the battery connected ringing generator. In either event the ring cutoff relay R470, at its contacts 471, completes a circuit for operating the ring cutoff slave relay R460 by way of the grounded conductor C100, the contacts 542 and 471, and the winding of the relay R460, to battery. Upon operating the relay R460, at its contacts 468, completes a locking circuit for itself which is independent of the contacts 471 in its initial energizing circuit. Also, at its contacts 461 and 465, the relay R460 interrupts the previously traced signaling circuit for the called subscriber, thereby to interrupt the transmission of ringing code and also to interrupt the circuit for the ring cutoff relay R470, which relay now restores to normal. At its contacts 462 and 466, the relay R460 connects the previously described direct current circuit including the called subscriber line, the wipers 581 and 582, the contacts 521 and 523, and the contacts 462 and 466 to the circuit including the contacts 332 and 334 and the upper and lower windings of the answer relay R320. As a result of the above-described direct current circuit the answer relay R320 operates. As a further result of the operation of relay R460, at its contacts 466′ and 465′, it removes the starting ground potentials from the motor start conductor C606 and the ringing machine start conductor C605. Finally, at its contacts 463′, the relay R460 disconnects the dial tone and pickup relay R420 from the PU–1 conductor C555, thereby to cause the latter relay to restore if it is in its operated position and to prevent its operation if it is in its restored position; and, at its contacts 462′, it prepares a circuit for the relay R420, whereby the relay may be subsequently controlled by the application of a ground potential to the warning tone conductor C294.

When the answer relay R320 is operated in the manner described above, at its contacts 321 to 324, inclusive, it reverses the battery and ground connection, including the upper and lower windings of the line relay R270, to the negative and positive conductors C41 and C42 extending to the calling subscriber line. Since the present call originated at a subscriber substation the reversal of the direction of current flow over the calling line loop circuit has no function to perform at the present time. However, it may be well to mention at this time that if the call had orginated at an operator position the reversal of current would then be utilized to give the calling operator the usual answering supervisory signal. As a further result of the operation of relay R320, at its contacts 326, it interrupts a point in the conversation timing circuit for the timing relay R210 in the event the particular call under consideration is a toll call and is, therefore, to be timed by the toll operator. In the present case the call will be timed by the connector 200, in the manner to be described hereinafter.

Following the operation of the answer relay R320 a conversational connection is established between the calling subscriber at substation A1 and the called subscriber at substation B1 over a path which may be traced from the calling subscriber at substation A1, the line circuit 20, the conductors C31 and C32, the wipers 312 and 313, the finder 300, the negative and positive conductors C41 and C42, the contacts 261 and 263, 371 and 372, the condensers 378 and 379, the contacts 462 and 466, 521 and 523, the wipers 581 and 582, the negative and positive conductors extending to the line circuit 502, the called party line 601 and the substation B1 of the called subscriber. In this regard it will be noted also that talking battery is applied to the conductors of the calling subscriber line through the windings of the line relay R270, and that talking battery is applied to the conductors of the called party line through the windings of the answer relay R320.

From the foregoing explanation of operation of the connector 200 it will be understood that when the first digit of the called subscriber directory number is the digit "2" or "4" and the last digit is an odd numbered digit, the rotary interrupter relay R510 will remain in its normal position so that the ringing code signal will be transmitted over the negative conductor of the called subscriber line. In the event that the first digit dialed by the calling subscriber is either the digit "2" or the digit "4" and the last digit of the directory number is an even numbered digit, the rotary interrupter relay R510 will be operated so that the ringing code signal will be transmitted over the positive conductor of the called subscriber line. The circuit for operating the rotary interrupter relay R510 when the last digit dialed into the connector 200 is an even numbered digit may be traced from the grounded conductor C100 by way of the contacts 542 (after the transfer control relay R540 restores at the end of the last digit), the contacts 445 and 457, the even numbered contacts accessible to the wiper 577 of the minor switch 570, and then by way of the contacts 526 and the upper winding of the rotary interrupter relay R510, to battery, or by way of the contacts 455 and 526 and the upper winding of the relay R510, to battery, in the event the wiper 577 engages the sixth contacts in its associated contact banks. Upon operating the rotary interrupter relay R510, at its contacts 511 to 514, inclusive, reverses the circuit over which ringing current is transmitted whereby the selected ringing code signal is transmitted over the positive conductor of the called subscriber line. The operations described above are also performed in the event that the first digit dialed by the calling subscriber is either the digit "3" or the digit "5," with the exception that the pickup control relay R550 is in its operated position in order to place the dial tone and pickup relay R420 under control of the PU-2 conductor C556 instead of under the control of the PU-1 conductor C555. When the relay R420 is controlled over the PU-2 conductor C556 a short preliminary ringing period is introduced prior to the normal portion of the ringing code (which is transmitted when the PU-1 conductor C555 is utilized), and in this manner the second group of ten ringing codes constitutes different signals from the first group of ten ringing codes. With his arrangement, twenty different ringing code signals may be transmitted to signal twenty different subscriber substations located on a twenty party line.

*Release*

During the time the conversation is taking place between the calling subscriber at substation A1 and the called subscriber at substation B1, the relays R270, R280, R310, R320, R340, R360, R430, R440, R450, R460, R520 and R530 are in their operated position. The release of the abovementioned connection is entirely under control of the calling subscriber at substation A1. Thus if the connection is released at the called subscriber substation B1 by restoring the receiver upon the associated switchhook prior to its release by the calling subscriber at substation A1, the only resulting operation in the connector 200 is the restoration of the answer relay R320 to its normal position. Upon restoring the answer relay R320, at its contacts 321 to 324, inclusive, again reverses the battery potential and the ground potential connected to the negative and positive talking conductors C41 and C42 in order to give disconnect supervision in the event that the connection originated from an operator position.

When the calling subscriber at substation A1 releases the connection by restoring the receiver upon the switchhook of the associated telephone instrument the loop circuit including the talking conductors C41 and C42 is interrupted and thereby causes the line relay R270 in the connector 200 to restore to normal. Upon restoring the relay R270, at its contacts 273, interrupts the circuit of the lock-pulse relay R280, which also restores to normal. Finally, at the contacts 272, the relay R270 interrupts a point in the multiple circuit for the slow-to-release release control relay R310. Upon the restoration of the lock-pulse relay R280, at its contacts 282, it interrupts a further point in the multiple circuit for the release control relay R310, which now slowly restores to normal. Incident to the restoration of relay R310, at its contacts 315', it interrupts the circuit for the release control slave relay R340 which also restores to normal. As a further result of the restoration of the release control relay R310, at its contacts 314', it interrupts the circuit whereby ground potential is returned over the conductor C43 thereby to cause the restoration of the finder 300, the cutoff relay (not shown) in the line circuit 20 and the removal of the busy marking condition from the calling subscriber line. The release control slave relay R340 now restores to normal and, at its contacts 344, removes ground potential from the conductor C100 whereupon the control relay R360, the minor switch off-normal relay R430, the vertical transfer relay R440, the rotary disconnect relay R450, the ring cutoff-slave relay R460, the idle test relay R520 and the rotary transfer relay R530, which are locked to this conductor, are now restored to normal. Also, at its contacts 343, the relay R340 prepares a point in the circuit for energizing the minor switch release magnet 573 and the Strowger switch release magnet 290. As soon as the idle test relay R520 restores to normal, at its contacts 527, it completes the circuit for the above-mentioned minor switch release magnet 573 from ground by way of the contacts 527, 343, 268 and 316′, the minor switch off-normal contacts 572 and the winding of the minor switch release magnet 573, to battery. The latter magnet now operates in order to restore the wipers 571 and 577 to their normal resting positions. Furthermore, when the above-traced circuit is completed for the minor switch release magnet 573 a multiple circuit is completed by way of the vertical off-normal contacts 291 and the winding of the Strowger switch release magnet 290, to battery.

As soon as the wipers 571 and 577 of the minor switch 570 are restored to their normal positions the minor switch off-normal contacts 572 are opened, thereby to interrupt the above-traced energizing circuit for the release magnet 573, which now restores to normal. Incident to the operation of the Strowger switch release magnet 290 the wipers 581 to 584, inclusive, of the connector 200 are restored to their normal vertical and rotary positions, in a well known manner. As soon as the wipers 581 to 584, inclusive, are restored to normal the vertical off-normal contacts 291 are opened, thereby to interrupt the above-traced energizing circuit for the release magnet 290, which now restores to normal. Also, when the vertical off-normal contacts 282 are closed, battery potential by way of the upper winding of the seizure relay R410 is again applied to the conductor C43, thereby to mark the connector as idle in the event it is used in a selector system employing selectors of the battery searching type. In the present system the connector 200 constitutes the connector portion of a finder-connector link and the battery potential applied to the conductor C43 merely prepares the connector for subsequent operation in response to a new call. The connector 200 is now fully restored to normal and is available for further use.

Referring now to the schematically illustrated finder 300 and the schematically illustrated line circuit 20, attention is directed to the fact that the manner in which this apparatus is restored to normal is fully described in detail in the above-mentioned Lomax application. The apparatus involved in the connection established between the calling subscriber at substation A1 and the called subscriber at substation B1 has now been restored to normal and may be utilized in the extension of further calls.

PRIVATE BRANCH EXCHANGE CALLS

The manner in which calls may be routed through the finder-connector link, comprising the finder 300 and the connector 200, to an idle P. B. X trunk in a group of trunks extending to a P. B. X operator switchboard is substantially the same as the operation thereof when a connection is extended to a called subscriber line. In considering this type of service it may be assumed that a group of P. B. X trunks, including the trunk 602, is terminated in the tenth level of the contact banks accessible to the wipers 581 to 584, inclusive. It may also be assumed that the subscriber at substation A1 desires to extend a connection over an idle one of said P. B. X trunks to the P. B. X operator and, in accordance with the usual procedure, the operator at the P. B. X switchboard will extend the connection manually to the desired called subscriber whose line is terminated in the P. B. X switchboard. Consequently, when the subscriber at substation A1 removes the receiver the finder 300 operates, in the manner previously described, and the connector 200 is conditioned to respond to the directory number designating the P. B. X group of trunks. For the purpose of describing the operation of the connector 200 to extend a connection to an idle P. B. X trunk, it will be assumed that the trunk group consists of ten trunks extending to the P. B. X switchboard and that the directory number thereof is "2011."

When the connector 200 is seized, in the manner described above, the relays R270, R280, R310, R340, R410 and R420 are in their operated position to condition the connector to respond to the first digit "2" of the P. B. X trunk group directory number. In response to the dialing of the first digit "2" the minor switch stepping magnet 573 operates to position the wipers 571 and 577 into engagement with the second contacts in the associated contact banks. When the minor switch off-normal contacts 557 are closed the minor switch off-normal relay R430 operates and, at the end of the digit the transfer control relay R540 restores to normal and causes the operation of the vertical transfer relay R440, all in the manner previously described. The relay R440 upon operating transfers the impulsing circuit from the minor switch stepping magnet 574 to the vertical magnet 560, thereby to prepare the connector to respond to the second digit "0."

When the ten impulses of the second digit "0" are dialed into the connector 200 the vertical magnet 560 is operated ten times and thus elevates the wipers 581 to 584, inclusive, to a position opposite the tenth level of the associated contact bank which terminates the ten trunks in the P. B. X group of trunks. Shortly following the last impulse of the second digit "0" the transfer control relay R540 again restores to normal and now completes the previously described circuit for operating the rotary transfer relay R530. Upon operating, the relay R530 now transfers the impulsing circuit from the vertical magnet 560 to the rotary magnet 490 in order to prepare the connector to respond to the third digit of the P. B. X directory number. Also, upon operating the rotary transfer relay R530, at its contacts 534, completes the previously described operating circuit for the minor switch release magnet 573, whereupon the wipers 571 and 577 of the minor switch 570 are restored to their normal resting positions. As soon as the wipers 571 and 577 restore to their normal resting positions the minor switch off-normal contacts 572 are opened in order to interrupt the circuit for the minor switch release magnet 573 which now restores to normal, and the minor switch off-normal contacts 557 are opened thereby to interrupt the circuit of the minor switch off-normal relay R430, which also restores to normal.

When the single impulse of the third digit "1" is dialed into the connector, a single impulse is transmitted over the impulsing circuit to the rotary magnet 490 in the manner previously described. Upon operating the rotary magnet 490 rotates the wipers 581 to 584, inclusive, into engagement with the first set of contacts in the tenth level of the associated contact banks. At the end of the first digit "1" the transfer control relay R540 restores to normal and completes the previously described circuit for energizing the rotary disconnect relay R450. The latter relay, at its contacts 452′, interrupts a point in the circuit for the slow-to-release seizure relay R410 and, at its contacts 454', it interrupts a point in the holding circuit for the vertical transfer relay R440. In the present example it is assumed that the first trunk of the P. B. X trunk group is busy. Attention is directed, however, to the fact that the contact engaged by the C wiper 583 is jumpered by means of the "X" jumper to the corresponding contact engaged by the EC wiper 584. These contacts of each of the first nine trunks in the P. B. X trunk group are jumpered in the manner indicated in order to control automatic step-by-step movement of the wipers 581 to 584, inclusive, in the event the corresponding trunks are busy. The last or tenth trunk in the P. B. X group is not jumpered in the manner described above in order to prevent further rotation of the wipers even though the last trunk in the P. B. X group is also busy. With this arrangement if all ten P. B. X trunks are busy the wipers of the connector 200 will be automatically rotated to the last or tenth trunk in the group and the busy tone signal will be transmitted to the calling subscriber. When the C wiper 583 engages the first busy trunk in the P. B. X group, ground potential is encountered and causes the operation of the busy test relay R350 prior to the restoration of the slow-to-release seizure relay R410 at the end of the third digit. This circuit may be traced from the ground potential applied to the C wiper 583 by way of the conductor C101, the contacts 413 and the winding of the busy test relay R350, to battery. Upon operating the relay R350, at its contacts 358, prepares a point in the circuit for controlling the rotary interrupter relay R510.

Shortly after the single impulse of the third digit is transmitted to the connector 200, the transfer control relay R540 restores to normal and, at its contacts 543, completes a circuit for operating the rotary disconnect relay R450. This circuit may be traced from the grounded conductor C100 by way of the contacts 542, 445 and 456, the rotary off-normal contacts 480 and the winding of the rotary disconnect relay R450, to battery. Upon operating the relay R450, at its contacts 459, locks itself to the conductor C100. Simultaneously therewith, at its contacts 452', the relay R450 interrupts a point in the locking circuit for the lower winding of the slow-to-release seizure relay R410; at its contacts 451', it prepares a point in the circuit for maintaining the seizure relay R410 in its operated position in the event the first trunk is busy, as indicated; and, finally, at its contacts 453', it completes the above-mentioned circuit for controlling the operation of the rotary interrupter relay R510.

Inasmuch as it has been assumed that the first P. B. X trunk in the group is busy the ground potential applied to the C wiper 583 is also applied to the EC wiper 584 by way of the associated "X" jumper. This ground potential is further extended by way of the contacts 552, 453', 358, 415, 517 and 492 and the lower winding of the rotary interrupter relay R510, to battery. Upon operating the relay R510, at its contacts 515, now completes a circuit for operating the rotary magnet 490 in multiple with the lower winding of the seizure relay R410. This circuit may be traced from ground by way of the vertical off-normal contacts 419, the contacts 416, 456', 421' and 515, one branch extending by way of the rotary magnet 490 to battery and the other branch extending by way of the contacts 451' and the lower winding of the relay R410 to battery. As a further result of the operation of the rotary interrupter relay R510, at its contacts 516 and 517, it transfers its initial energizing circuit from the grounded EC wiper 584 to the circuit including ground potential at the vertical off-normal contacts 419. When the rotary magnet 490 is energized over the above-traced circuit it steps the wipers 581 to 584, inclusive, into engagement with the second set of contacts in the selected level terminating the second trunk in the P. B. X trunk group. Furthermore, at its contacts 492, the rotary magnet 490 interrupts a point in the above-traced circuit for the lower winding of the rotary interrupter relay R510, which now restores to normal. Upon restoring, the relay R510, at its contacts 515, interrupts a multiple circuit for the lower winding of the relay R410 and the rotary magnet 490. The rotary magnet 490 now restores to normal and, at its contacts 492, reestablishes a point in the previously traced circuit for operating the rotary interrupter relay R510. As a further result of the restoration of the relay R510, at its contacts 516 and 517, it again transfers the initial energizing circuit for itself from ground at the vertical off-normal contacts 419 to the EC wiper 584. The seizure relay R410, however, due to its slow-to-release characteristics, does not immediately restore after its holding circuit is interrupted upon the restoration of the rotary interrupter relay R510, and, consequently, at its contacts 413, it maintains the winding of the busy test relay R350 connected to the C wiper 583.

In the event that the second P. B. X trunk in the selected group is also busy, ground potential is again encountered by the C wiper 583 and the EC wiper 584, in the manner described above. Consequently the circuit is again completed, including the conductor C101 for reoperating the busy test relay R350. Also a circuit is again completed, including the EC wiper 584, for reoperating the rotary interrupter relay R510. Upon reoperation the rotary interrupter relay R510 again causes an additional operation of the rotary magnet 490, in the manner previously described. Thus the wipers of the connector 200 are advanced an additional step in the rotary direction into engagement with the third set of contacts terminating the third trunk in the selected P. B. X trunk group. The above described sequence of operations is repeated each time a busy P. B. X trunk is encountered by the wipers 583 and 584 as they are advanced step by step in the rotary direction. When an idle trunk is encountered, the busy marking ground potential is not encountered by the contact engaged by the wiper 583 and consequently the busy test relay R350 is not operated. In the latter event the rotary interrupter relay R510 is not reoperated and a holding circuit is not recompleted for the seizure relay R410, which now restores to normal. Upon restoring the relay R410, at its contacts 412, completes the circuit for operating the idle test relay R520 in the manner previously described, whereupon the connector is prepared to transmit the selected ringing code signal over the selected P. B. X trunk line to the P. B. X switchboard (not shown).

When the fourth digit "1" of the director number of the P. B. X group of trunks is dialed into the connector 200, a single pulse is transmitted from ground by way of the contacts 222, 281, 341 and 442 for operating the minor switch stepping magnet 574 and, in multiple therewith, a circuit is completed by way of the contacts 433 for operating the transfer control relay R540. The magnet 574 now operates to rotate the wipers 571 and 577 into engagement with the first set of contacts in the associated contact banks. As soon as the wipers of the minor switch 570 are moved from their normal resting positions the minor switch off-normal contacts 572 are closed in order to prepare a point in the previously described circuit for controlling the minor switch release magnet 573, and the minor switch off-normal contacts 557 are closed in order to reoperate the minor switch off-normal relay R430. Upon operating the relay R430, at its contacts 435, completes a circuit for reoperating the vertical transfer relay R440. At the end of the fourth digit "1" the transfer control relay R540 restores to normal and, at its contacts 542, now completes a circuit from the grounded conductor C100, by way of the contacts 542, 444, 427 and 435, for operating the vertical transfer relay R440. Upon operating the latter relay, at its contacts 446, completes a locking circuit for its lower winding by way of the contacts 455′, the minor switch off-normal contacts 557 and the grounded conductor C100. Finally, at its contacts 448, the relay R440 completes the circuit whereby the PU-1 conductor C555 controls the operation of the dial tone and pickup relay R420, in the manner previously described. From this point the manner in which the selected ringing code is transmitted over the P. B. X trunk, to energize the drop or other signal individual thereto and provided at the P. B. X switchboard, is exactly the same as described hereinbefore with reference to the manner in which the called subscriber at substation B1 is signaled. Since the final digit dialed into the connector 200 has positioned the minor switch wiper 571 into engagement with the first contact in its associated contact bank, the first ringing code, which is usually a long single ring, is periodically transmitted over the selected P. B. X trunk to the signaling device at the P. B. X switchboard.

When the P. B. X operator answers the call the ring cutoff relay R470, the ring cutoff slave relay R460 and the answer relay R320 are operated in the manner previously described in order to terminate the transmission of the ringing code signal and to complete the talking connection between the calling subscriber at substation A1 and the P. B. X operator position. The calling subscriber now informs the P. B. X operator that he desires to talk to a particular subscriber whose line is terminated in the P. B. X switchboard, whereupon the operator completes the circuit to the desired called P. B. X subscriber in a well known manner.

In describing the operation of the connector 200 the automatic trunk hunting feature was described prior to the detailed description of operation as a result of the dialing of the final digit "1." It should be understood, however, that these two operations may be performed concurrently without any interference with each other. In other words, the calling subscriber may dial the final digit in order to control the minor switch stepping magnet 574 at the same time the rotary interrupter relay R510 and the rotary magnet 490 cooperate to advance the wipers step by step to select an idle P. B. X trunk. It should also be understood that if all of the trunks in the selected group are busy and the wipers of the connector are automatically rotated into engagement with the last or tenth busy trunk in the group, the busy test relay R350 remains in its operated position but the rotary interrupter relay R510 remains in its deenergized position. The latter relay cannot operate when the last or tenth trunk in the selected P. B. X group is busy because the "X" jumper is omitted between the corresponding contacts engaged by the wipers 583 and 584 of the last or tenth trunk in the group. With the busy test relay R350 in its operated position after the final digit is dialed into the connector, the minor switch off-normal relay R430 upon operating, at its contacts 432, completes the previously described circuit for transmitting the busy tone signal to the calling subscriber at substation A1. From the foregoing it will be understood that the busy tone signal is transmitted to the calling subscriber only in the event that all of the trunks in the selected P. B. X trunk group are tested as being busy and after the last digit of the P. B. X directory number has been dialed.

*Night service*

In the foregoing description of the operation of the connector 200 an idle trunk extending to the P. B. X switchboard was automatically selected in response to the dialing of the directory number "2011" designating the group of ten P. B. X trunks. Furthermore, the P. B. X operator at this switchboard completed the connection to the particular called subscriber line terminating in the P. B. X switchboard. Since P. B. X facilities are usually provided in business establishments having a greater number of subscriber lines than trunks terminating in the switchboard, a considerable saving is made to the business establishment by handling the calls to and from the said P. B. X subscriber lines by way of the P. B. X trunks. It is also the usual practice in this type of service that the P. B. X switchboard be attended by an operator during the business hours of the day and, before going off duty at the end of the day, the operator plugs her cord circuits to the ten P. B. X trunks terminating in her switchboard and to ten subscriber lines serving certain key individuals in the business establishment, whereby night service is provided for such lines. In order to provide direct connections to such preferred subscriber lines, the connector 200 is arranged so that calls may be selectively extended over the different trunks in the P. B. X group to a particular called subscriber line arranged for night service. This permits different directory numbers to be utilized for day and night service, respectively, the first directory number "2011" being utilized when the P. B. X switchboard is attended by an operator and the latter directory numbers listed below being assigned to the individual subscriber lines provided with night service. In the present example the directory numbers of the individual subscriber lines provided with night service, and corresponding to the ten different trunks in the P. B. X group, are respectively "3011," "3021," "3031," "3041," "3051," "3061," "3071," "3081," "3091" and "3001."

If the first digit "3" is dialed into the connector 200 the wipers of the minor switch 570 are positioned into engagement with the third contacts in the associated contact banks and a circuit is thus prepared for controlling the pickup control relay R550. This circuit is completed as soon as the transfer control relay R540 restores to normal at the end of the second digit. The circuit for energizing the relay R550 may be traced from ground by way of the vertical off-normal contacts 419, the contacts 436, 544 and 537, the third contacts of the banks engaged by the wiper 577 and the lower winding of the relay R550, to battery. Upon operating the relay R550, at its contacts 551, completes a locking circuit for its upper winding which includes the grounded conductor C100. Also upon operating the relay R550, at its contacts 552, interrupts a point in the previously described circuit for controlling the rotary interrupter relay R510, thereby to prevent the automatic trunk hunting facilities from subsequently operating in the event the selected P. B. X trunk is busy. Finally, at its contacts 554 and 553, the relay R550 transfers the control of the dial tone and pickup relay R420 from the PU–1 conductor C555 to the PU–2 conductor C556, thereby to determine that a ringing code signal in the second group of ten ringing codes will be utilized to signal the subscriber substation connected for night service. Since the relay R550 is operated by the first digit "3" dialed into the connector 200, the automatic trunk hunting action is suppressed and the connector will respond to the second digit "0" to advance the wipers in a vertical direction to the tenth level and will respond to the variable third digit to rotate the wipers into engagement with the particular set of contacts corresponding to the numerical value of the third dialed digit. The fourth and final digit is the digit "1" and the minor switch 570 responds, in the manner previously described, to cause the first ringing code in the second group of ten ringing codes to be transmitted over the selected P. B. X trunk in order to signal the particular subscriber whose line has been connected up for night service. In the event the particular selected P. B. X trunk line is busy and the wipers of the connector are positioned into engagement therewith, the busy tone signal will be transmitted to the calling subscriber in the same manner as when a call is extended to a busy regular subscriber line.

TRUNK CALLS

In considering the operation of the connector 200 automatically to select an interoffice trunk and to switch a calling subscriber loop circuit through to the selected trunk, it will be assumed that the above-described call originating at the substation A1 is intended to be extended to a toll operator position in the central office, not shown. It will be further assumed that the directory number "0" is assigned to the group of toll trunks interconnecting the instant exchange with the distant central office. After a call is extended from the calling subscriber at substation A1 to the connector 200, in the manner previously described, and when the single digit "0" is dialed thereinto, ten current pulses are transmitted to the line relay R270. The line relay R270 and the lock-pulse relay R280 function, in the manner previously described, to transmit ten pulses to the minor switch stepping magnet 574 and, in multiple therewith to the transfer control relay R540. The first six pulses transmitted to the minor switch stepping magnet 574 advance the minor switch wipers 571 and 577 into engagement with the sixth contacts in their respective banks.

During the transmission of the above-mentioned six pulses, and during the transmission of the remaining four pulses, the transfer control relay R540 remains in its operated position but the minor switch stepping magnet 574 responds only to the first six pulses and the vertical magnet 560 responds to the last four of the ten pulses. More specifically, as soon as the minor switch wipers 571 and 577 are advanced from their normal resting positions the minor switch off-normal contacts 557 are closed, thereby to complete the previously traced circuit for the minor switch off-normal relay R430, which immediately operates. At its contacts 435, the relay R430 prepares a point in the circuit for the upper winding of the vertical transfer relay R440, which circuit is completed as soon as the wiper 577 of the minor switch 570 engages the sixth contacts in its associated contact banks. Consequently, as soon as the minor switch stepping magnet 574 restores to normal at the end of the sixth pulse, at its contacts 576, a circuit is completed from the grounded conductor C100 by way of the contacts 576 and 533, the sixth contacts bridged by the wiper 577, the contacts 454, 426 and 435, and the upper winding of relay R440 to battery. The relay R440 upon operating, at its contacts 446, completes the previously traced locking circuit for itself, including the grounded conductor C100 and, at its contacts 442 and 443, it transfers the pulsing circuit from the minor switch stepping magnet 574 to the vertical magnet 560. In view of the above, the remaining four pulses of the digit "0" dialed by the calling subscriber are transmitted to the vertical magnet 560. Each time the vertical magnet 560 is energized it completes, at its contacts 561, the previously described circuit for controlling the lock-pulse relay R280 and, in addition thereto, it advances the wipers of the connector 200 step by step in a vertical direction. At the end of the fourth pulse transmitted to the vertical magnet 560 the wipers 581 to 584, inclusive, are positioned opposite the fourth level of contacts in the associated bank contacts. As soon as the wipers are advanced in a vertical direction away from their normal resting positions the vertical off-normal contacts 419 are closed, thereby to complete a circuit for operating the trunk hunting relay R230 in multiple with the rotary interrupter relay R510. This circuit may be traced from ground by way of the vertical off-normal contacts 419, the contacts 416 and 447, one branch extending by way of the contacts 423′ and the winding of the trunk hunting relay R230 to battery, and the other branch extending by way of the contacts 422′, 517 and 492 and the lower winding of the rotary interrupter relay R510 to battery. The relay R230 operates and, at its contacts 236, completes a locking circuit for itself which includes the contacts 416 and the vertical off-normal contacts 419. The relay R510 upon operating, at its contacts 517, interrupts its initial energizing circuit and simultaneously therewith, at its contacts 516, it completes a locking circuit for itself which is independent of the contacts 422′ of the relay R420. In response to the operation of the relay R230, at its contacts 233, it prepares a point in the circuit for operating the trunk switch-through relay R260 in series with itself. As a further result of the operation of the rotary interrupter relay R510, at its contacts 515, it prepares a point in the circuit for operating the rotary magnet 490. This circuit, however, is open at the contacts 421′ and cannot be completed until the relay R420 restores at the end of the digit "0."

Shortly after the ten pulses of the digit "0" have been transmitted the transfer control relay R540 restores to normal. Upon restoring, the relay R540, at its contacts 543, interrupts the holding circuit for the dial tone and pickup relay R420, which now restores to normal. Upon restoring, the relay R420, at its contacts 421′, completes a circuit for operating the rotary magnet 490 which may be traced from ground by way of the vertical off-normal contacts 419, the contacts 416, 447, 421′ and 515 and the winding of the rotary magnet 490 to battery. The rotary magnet 490, upon operating, rotates the wipers of the connector 200 into engagement with the first set of contacts in the fourth level of associated contact banks, whereupon a test circuit will be completed to determine whether or not the first trunk extending to the central office is idle and available for use or is busy. As a further result of the operation of the rotary magnet 490, at its contacts 492, it interrupts the previously traced circuit for the lower winding of the rotary interrupter relay R510, which restores to normal. Incident to the restoration of the relay R510, at its contacts 515, it interrupts the circuit of the rotary magnet 490 which also restores to normal. As soon as the wipers of the connector 200 are advanced in a rotary direction away from their normal positions, the rotary off-normal contacts 480 are closed and a circuit is immediately completed for operating the rotary disconnect relay R450. The last-mentioned circuit may be traced from the grounded conductor C100 by way of the contacts 542, 445 and 456, the rotary off-normal contacts 480 and the winding of the relay R450, to battery. Upon operating the relay R450, at its contacts 459, locks itself directly to the grounded conductor C100. As a further result of the operation of relay R450, at its contacts 452′, it disconnects the lower winding of the seizure relay R410 from the grounded conductor C100 and, at its contacts 451′, it connects the lower winding thereof in multiple with the rotary magnet 490. Referring again to the restoration of the transfer control relay R540, it is noted that, at its contacts 544, it completes a circuit for operating the lower winding of the rotary transfer relay R530 which may be traced from ground by way of the vertical off-normal contacts 419, the contacts 436, 544 and 537 and the lower winding of the relay R530 to battery. Upon operating the relay R530, at its contacts 535, completes a locking circuit for its upper winding which includes the grounded conductor C100; at its contacts 537, it interrupts its initial energizing circuit; and, at its contacts 539′, it completes the previously mentioned circuit for grounding the ringing machine start conductor C605.

If the first toll trunk in the selected fourth level is busy, a busy marking ground potential will be encountered by the C wiper 583. The bank contact engaged by the EC wiper 584 is directly grounded, as is illustrated in Fig. 5, and each succeeding contact in this level terminating an associated trunk is jumpered to the preceding grounded contact by means of the Y jumpers so that all of the EC bank contacts, except the contact corresponding to the last trunk in the level, are grounded. This grounded jumpering arrangement of the bank contacts accessible to the EC wiper 584 is provided on all of the different levels of the connector terminating trunks, so that the wipers of the connector 200 will automatically rotate to the next trunk in a selected level each time a busy trunk is encountered. However, when the last trunk in the group is reached and it is also busy, no ground potential is provided on the corresponding contact engaged by the EC wiper 584 in order to prevent further rotation of the connector wipers and to cause a busy tone signal to be transmitted to the calling subscriber. The busy marking ground potential thus encountered by the C wiper 583 is extended by way of the conductor C101, the contacts 413 and the winding of the busy test relay R350 to battery. The busy test relay R350 operates when the above-traced circuit is completed and, at its contacts 358, completes a circuit for reoperating the rotary interrupter relay R510. The last-mentioned circuit may be traced from ground potential applied to the EC wiper 584 by way of the contacts 552, 453′, 358, 415, 517 and 492 and the lower winding of the rotary interrupter relay R510, to battery. Upon operating the relay R510, at its contacts 516 and 517, transfers its initial energizing circuit from ground potential at the EC wiper 584 to ground potential at the vertical off-normal contacts 419. As a further result of the operation of relay R510, at its contacts 515, it completes a circuit whereby the rotary magnet 490 is reoperated and the multiple connected seizure relay R410 is reenergized in order to retain the last-mentioned relay in its operated position. The last-mentioned circuit may be traced from ground by way of the vertical off-normal contacts 419, the contacts 416, 447, 421′ and 515, one branch including the winding of the rotary magnet 490, and the other branch including the contacts 451′ and the lower winding of the seizure relay R410. Upon operating the rotary magnet 490 advances the wipers into engagement with the second set of contacts in the selected fourth level and, at its contacts 492, it interrupts the above-mentioned locking circuit for the rotary interrupter relay R510. The relay R510 now restores to normal and, at its contacts 515, interrupts the circuit for the rotary magnet 490 which also restores to normal. As soon as the C wiper 583 engages the second set of contacts in the associated contact banks a test circuit is again completed for the busy test relay R350. Further operation of the connector 200 depends upon the idle or busy condition of the second trunk in the selected group. If the second trunk is busy the rotary interrupter relay R510 and the rotary magnet 490 will cooperate, in the manner previously described, in order to advance the wipers 581 to 584, inclusive, into engagement with the third set of contacts in the selected level. Thus it will be seen that under control of the busy test relay R350, the rotary interrupter relay R510 and the rotary magnet 490, the wipers of the connector 200 may be advanced step by step over the contacts in the selected fourth level to search for an idle toll trunk extending to the central office.

When an idle toll trunk is selected a busy marking ground potential will not be encountered by the C wiper 583 and the EC wiper 584 and therefore the busy test relay R350 will remain in its restored position. Furthermore, the rotary interrupter relay R510 will remain in its restored position due to the fact that its energizing circuit which includes the EC wiper 584 is opened at the contacts 358 of the busy test relay R350. Shortly after the wipers of the connector are positioned into engagement with the contacts terminating the idle toll trunk, the seizure relay R410 restores to normal and, at its contacts 416, it interrupts a point in the circuit for the trunk hunting relay R230. When this operating ground potential is removed from the relay R230 the shunt circuit around the trunk switch-through relay R260 is removed, thereby to permit the last-mentioned relay to operate in series with the trunk hunting relay R230. The last-mentioned circuit may be traced from ground by way of the contacts 524, 342, 356 and 233, and the windings of the relays R260 and R230 to battery. The relay R230 remains in its operated position and the relay R260 operates and, at its contacts 262 and 264, connects the calling subscriber loop circuit directly through to the negative and positive wipers 581 and 582. When the calling subscriber loop circuit is extended to the wipers 581 and 582 a circuit is completed from the selected toll trunk to a toll line repeater (not shown) and certain relays in the repeater are operated in a well known manner in order to signal the toll operator in the central office and to return ground potential over an associated C conductor to the C wiper 583. The ground potential applied to the C wiper 583 is further extended by way of the conductor C101 and the contacts 267, one branch of the circuit including the windings of the trunk switch-through relay R260 and the trunk hunting relay R230, thereby to retain the last-mentioned relays in their operated positions, and the other branch of the circuit is extended by way of the contacts 265 and the conductor C43 in order to maintain the switch-through relay (not shown) in the finder 300 and the cutoff relay (not shown) in the line circuit 20 in their operated positions. It should be understood that the finder-connector link comprising the finder 300 and the connector 200 is retained in its operated position under control of the toll operator at the central office through the medium of the above-mentioned repeater.

As a further result of the operation of the trunk switch-through relay R260, at its contacts 261 and 263, it interrupts the previously traced loop circuit for the line relay R270 which now restores to normal. Upon restoring the relay R270, at its contacts 272, interrupts a point in the locking circuit for the release control relay R310 and, at its contacts 273, it interrupts a point in the locking circuit for the lock-pulse relay R280 which also restores. The latter relay upon restoring, at its contacts 282, interrupts a further point in the multiple circuit for the release control relay R310 which now slowly restores to normal. Upon restoring, the release control relay R310, at its contacts 315′, interrupts the circuit for the release control slave relay R340 which also slowly restores to normal. As soon as the release control slave relay R340 restores, at its contacts 346, it removes the holding ground potential from the conductor C100, thereby to interrupt the locking circuits for the control relay R360, the minor switch off-normal relay R430, the vertical transfer relay R440, the rotary disconnect relay R450, and the rotary transfer relay R530, which relays now restore to normal.

In view of the foregoing it will be understood that the only two relays in the connector which remain in their operated position when a connection is extended over one of the toll lines to the central office are the relays R260 and R230. The relay R260, at its contacts 268, prevents the circuit for controlling the release magnet 290 and the minor switch release magnet 573 from being closed until the ground potential applied to the C wiper 583 is removed therefrom by the toll operator.

The toll operator at the central office may now complete the connection between the calling subscriber at substation A1 and a desired called subscriber through the medium of the equipment provided at the central office exchange in a well known manner. When the calling subscriber at substation A1 releases the connection by replacing his receiver upon the switchhook of the associated telephone instrument, the calling line loop circuit is interrupted thereby to cause the toll repeater (not shown) to give the toll operator a disconnect signal. The toll operator now breaks down the connection and in doing so causes the above-mentioned repeater to remove the holding ground potential from the C wiper 583 and thus causes the trunk switch-through relay R260 and the trunk hunting relay R230 to restore to normal. Furthermore, the ground potential is thereby also removed from the conductor C43 in order to interrupt the holding circuit for the switch-through relay in the finder 300 and the cutoff relay in the line circuit 20. The finder 300 and the line circuit 20 are thus restored to normal, in the manner described in detail in the previously mentioned Lomax application. Incident to the restoration of the trunk switch-through relay R260, at its contacts 268, it completes a circuit for energizing the release magnet 290 and the minor switch release magnet 573. This circuit may be traced from ground by way of the contacts 527, 343 and 268, one branch extending by way of the vertical off-normal contacts 291 and the winding of the release magnet 290 to battery, and the other branch extending by way of the contacts 316′, the minor switch off-normal contacts 572, and the winding of the minor switch release magnet 573 to battery. The minor switch release magnet 573 operates when the above-traced circuit is completed and causes the wipers 571 and 577 to restore to their normal resting positions. Incident to the restoration of the wipers the minor switch off-normal contacts 572 are opened in order to interrupt the circuit for the minor switch release magnet 573 which now restores to normal. Incident to the operation of the release magnet 290, the wipers 581 to 584, inclusive, of the connector 200 are automatically restored to normal first in a rotary direction and then in a vertical direction, in a well known manner. As soon as the wipers restore to their normal resting positions the vertical off-normal contacts 291 are opened, thereby to interrupt the above-traced circuit for the release magnet 290, which also restores. The vertical off-normal contacts 392 are closed in order again to prepare the circuit for the upper winding of the seizure relay R410. The connector 200 is now fully restored to normal and is available for further use.

The manner in which calls may be routed through the illustrated connector 200 to their interoffice trunks terminating in the first, second and third levels of the contact banks thereof is exactly the same as has been described above with reference to the selection and seizure of an idle toll trunk terminating in the fourth level of bank contacts. An idle toll trunk is selected, as described above, by dialing the single digit "0." The three other groups of inter-office trunks terminating respectively in the first, second and third levels of the connector 200 may be selected respectively by dialing the single digits "7," "8" and "9." Each of the last-mentioned group of trunks is individual to an automatic suboffice whereby interexchange connections may be established between the subscribers in the instant exchange and the subscribers in the various suboffices. Furthermore, these groups of interconnecting trunk lines may be utilized by the various suboffice subscribers to extend connections through the switching apparatus in the instant exchange either to establish connections with other suboffices or to establish connections with the toll operator at the central office.

From the foregoing it will be understood that if the calling subscriber at substation A1 dials the single digit "7," "8" or "9," the connector 200 will operate in the same manner as described above in connection with the operation thereof when the single digit "0" is dialed. More particularly, the wipers 571 and 577 of the minor switch 570 will be advanced to the sixth contacts of the associated contact banks and the vertical magnet will be operated to advance the wipers 581 to 584, inclusive, in the vertical direction to the first, second or third level, depending respectively upon whether the single digit is "7," "8" or "9." The wipers of the connector are then automatically rotated over the contacts in the selected level until an idle trunk is selected. The connector 200 will then switch through and complete a connection between the calling subscriber at substation A1 and the selected trunk line extending to the automatic suboffice (not shown) terminating the selected group of trunks. The various trunks extending to the suboffices may include trunk repeaters of the type illustrated and described in the above-mentioned Lomax application, which repeaters will repeat signals transmitted by the calling subscriber to the particular selected automatic suboffice and will also return the holding ground potential to the connector 200 in order to retain the trunk hunting relay R230 and the trunk switch-through relay R260 in their operated positions, in the manner described.

After the trunk to the selected automatic suboffice has been seized and ground potential is returned to the connector 200, the calling subscriber at substation A1 may dial the digits of the directory number of the called subscriber in the selected automatic suboffice. The impulses constituting the digits of the called subscriber directory number will be repeated by the repeater (not shown) included in the trunk extending to the selected suboffice in order to extend the connection to the desired called subscriber, in the manner explained in the above-mentioned Lomax application. The release of the connection and the restoration of the automatic switching apparatus involved in the connection are exactly the same as have been described above.

CALLS FROM THE CENTRAL OFFICE TOLL OPERATOR

In the event that the toll operator at the central office desires to extend a connection to a subscriber whose line is terminated in the banks of the connector 200, one of the toll trunks interconnecting the central office and the instant exchange is seized, in a well known manner, thereby to control the associated repeater (not shown) and the line circuit (not shown) individual thereto. The line circuit is provided with conductors C161 to C163, inclusive, which terminate in the bank contacts accessible to the finder 300 in the same manner as a regular subscriber line, together with a start conductor C11 which controls the distributor 600, all in the manner described in the above-mentioned Lomax application. Incident to the seizure of the line circuit individual to the selected toll trunk the distributor 600 controls the finder 300, thereby to cause the wipers 312, 313 and 314 to engage the terminals in the associated contact bank terminating the conductors C161 to C163, inclusive. Incident to the seizure of the incoming toll line conductors C161 to C163, inclusive a loop circuit is completed for the line relay R270 in the connector 200 and ground potential applied to the conductor C163 is extended by way of the wiper 314 and the conductor C43 in order to cause the operation of the seizure relay R410. The line relay R270 operates over the loop circuit including the conductors C161 and C162 and, at its contacts 273, completes the previously described circuit for operating the lock-pulse relay R280. The lock-pulse relay R280 in turn upon operating, at its contacts 282, completes the previously traced circuit for operating the release control relay R310. Incident to the operation of the release control relay R310, at its contacts 315', it completes the operating circuit for the release control slave relay R340 and, at its contacts 314', it forwards ground potential applied to the conductor C43 to the lower winding of the control relay R360, thereby to shunt the latter relay and prevent its operation at this time. Since the control relay R360 is prevented from operating when a call is initiated by the toll operator, a circuit is prepared, at its contacts 366, whereby the monitoring relay R330 may be subsequently operated in the event the toll operator desires to cut in on a busy called line. Furthermore, by preventing the operation of the control relay R360, certain operating facilities in the connector 200 are controlled by the toll operator, which facilities are not available for the use of regular calling subscribers. Incident to the operation of the release control slave relay R340, at its contacts 344, it applies ground potential to the conductor C100, thereby to complete the previously traced holding circuit including the resistor 448 for the lower winding of the seizure relay R410. Also, the application of ground potential to the conductor C100 completes an operating circuit for the dial tone and pickup relay R420 by way of the contacts 538, 437 and 522' and the winding of the relay R420, to battery. At its contacts 422, the relay R420 upon operating completes the previously traced circuit whereby a dial tone signal is transmitted to the calling toll operator. The connector 200 is now conditioned for further operation and the relays R270, R280, R310, R340, R410 and R420 are in their operated positions.

The toll operator at the central office may now dial the four digits comprising the directory number of the desired called subscriber and for this purpose it will be assumed that the call is to be extended to the subscriber at substation B1 whose directory number is "2543." In response to the dialing of the first digit "2" of the called subscriber number the minor switch stepping magnet 574 advances the wipers 571 and 577 into engagement with the second contacts in the associated contact banks. As soon as the wipers 571 and 577 are advanced from their normal resting positions the minor switch off-normal contacts 557 are closed in order to complete the previously described circuit for operating the minor switch off-normal relay R430. It will be recalled that when a regular subscriber is extending a connection the operation of the relay R430 opened, at the contacts 434, the shut circuit for the lower winding of the control relay R360 in order to permit the last-mentioned relay to operate. In the present call, however, the shunt circuit is retained around the lower winding of the control relay R360 by the ground potential applied to conductor C43 and thus prevents its operation. At the end of the first digit "2" the transfer control relay R540 restores to normal and, at its contacts 543, interrupts the locking circuit for the relay R420 which restores to normal and, at its contacts 542, it now completes the previously traced circuit for energizing the vertical transfer relay R440. In response to the dialing of the second digit "5," the vertical magnet 500 advances the wipers 581 to 584, inclusive, in a vertical direction to a position opposite the fifth level of associated bank contacts. At the end of the second digit "5" the transfer control relay R540 again restores to normal and, at its contacts 544, now completes a circuit for operating the rotary transfer relay R530. This circuit extends from ground by way of the vertical off-normal contacts 410, the contacts 436, 544 and 537, and the lower winding of relay R530 to battery. Incident to the operation of the relay R530, at its contacts 535, it completes a locking circuit for itself; at its contacts 532, it prepares the circuit for controlling the rotary magnet 490; and, at its contacts 534, it completes the previously traced circuit for operating the minor switch release magnet 573, thereby to cause the wipers 571 and 577 to be restored to their normal resting positions. The minor switch off-normal contacts 572 are thus opened in order to interrupt the circuit for the minor switch release magnet 573, which restores, and the minor switch off-normal contacts 557 are opened in order to cause the restoration of the minor switch off-normal relay R530. The connector is now conditioned to respond to the third digit "4" of the called subscriber directory number and, as a result thereof, the rotary magnet 490 is controlled to rotate the wipers 581 to 584, inclusive, into engagement with the fourth set of contacts terminating the called subscriber line 601. As soon as the C wiper 583 engages the terminal of the called line, a circuit is completed whereby the winding of the busy test relay R350 is connected to the wiper 583 to determine whether the called line is busy. This circuit includes the wiper 583, the conductor C101, the contacts 413, the winding of the busy test relay R350 and battery. If the called line is busy ground potential will be applied to the wiper 583 in order to cause the operation of the busy test relay R350. At the end of the third digit "4" the transfer control relay R540 restores to normal and, at its contacts 542, completes the previously traced circuit including the rotary off-normal contacts 480 in order to operate the rotary disconnect relay R450. The latter relay upon operating locks itself to the grounded conductor C100, by way of its contacts 459; at its contacts 454', it interrupts the locking circuit for the vertical transfer relay R440 which restores to normal; and, at its contacts 452', it interrupts the locking circuit for the seizure relay R410 which also restores to normal. When the seizure relay R410 restores, at its contacts 413, it interrupts a point in the initial energizing circuit for the busy test relay R350, and, simultaneously therewith, at its contacts 414, it completes a locking circuit for the relay R350 which includes the contacts 355 and 342 and ground at the contacts 524. As a further result of the above-mentioned operation of the busy test relay R350, at its contacts 351, it completes a circuit for transmitting a busy tone signal applied to the conductor C318' by way of the condenser 327, and the contacts 331, 351, 361 and 431 to the calling operator, in the manner previously described.

In view of the foregoing operations of the connector 200, it is apparent that the busy tone signal is transmitted to the calling toll operator before the last digit of the called subscriber directory number has been dialed into the connector 200. It will be recalled that when a connection is extended from a regular calling subscriber line to a busy called line, the busy tone signal is withheld from transmission to the calling subscriber until the final digit of the called subscriber directory number has been dialed.

The toll operator has two alternative actions which she may exercise when a busy condition is encountered on a called subscriber line. She may release the connection in the manner to be described, by causing ground potential to be removed from the conductor C43 and by causing the restoration of the line relay R270, or she may dial the last digit of the directory number plus an additional single digit "1" in order to condition the connector 200 to camp on the busy called line and automatically signal the desired called subscriber as soon as the busy condition is removed.

Assuming that the toll operator desires to camp on the busy called line until it becomes idle, she now dials the fourth digit "3" of the called subscriber directory number. In response to this digit the line relay R270 and the lock-pulse relay R280 now cooperate to transmit three pulses to the minor switch stepping magnet 574 and to the transfer control relay R540. In response to the operation of the minor switch stepping magnet 574, the wipers 571 and 577 are positioned into engagement with the third set of contacts in the associated contact banks. As soon as the wipers are moved from their normal resting positions the minor switch off-normal contacts 572 and 557 are again closed, whereupon the latter contacts complete the previously mentioned circuit for operating the minor switch off-normal relay R430. Upon operating the relay R430 transfers the circuit over which the busy tone signal is transmitted to the calling operator from the contacts 431 to the contacts 432. At the end of the third pulse of the digit "3" the wipers 571 and 577 of the minor switch 570 are positioned into engagement with the third contacts in their associated contact banks and the third code ringing signal of the first group of ten codes is selected by the wiper 571 for signaling the called subscriber at substation B1. This signal cannot be transmitted at the present time, however, inasmuch as the dial tone and pickup relay R420 is in its restored position and is prevented from being operated until the idle test relay R520 is operated. Also, at the end of the last pulse of the digit "3" the transfer control relay R540 restores to normal and, at its contacts 542, recompletes the circuit including the contacts 444, 427 and 435 for reoperating the vertical transfer relay R440. It will be understood that the minor switch off-normal relay R430 operates as soon as the minor switch off-normal contacts 557 are closed. Upon operating the relay R440, at its contacts 446, completes a locking circuit for its lower winding over a circuit which includes the contacts 455', the minor switch off-normal contacts 557 and the grounded conductor C100. As a further result of the operation of the relay R440, at its contacts 441, it completes a circuit from the 60 I. P. M. conductor C607 by way of the resistor 449, the contacts 441, 411, 362 and 352, and the upper winding of the answer relay R320 to battery. The answer relay R320 is thereby operated sixty times per minute and each time it is operated the current flow over the conductors C41 and C42 is reversed, at the contacts 321 to 324, inclusive, in order that the repeater, included in the connection to the calling toll operator, may give a corresponding visual flashing signal to the operator and thus indicate that the called subscriber line is busy and that the final digit of the directory number has been dialed. With the above arrangement the toll operator receives an audible busy signal as soon as the busy called line is encountered at the end of the third digit dialed, and receives both the audible busy tone and the visual flashing signal after the final digit of the busy called subscriber directory number has been dialed into the connector 200.

In order to establish the camp on busy condition in the connector 200, whereby the busy test relay R350 will be automatically restored to normal as soon as the busy called line becomes idle, and thus initiate automatic signaling of the called subscriber at substation B1, the toll operator now dials the suffix digit "1." At the beginning of the single pulse the line relay R270 restores to normal and, at its contacts 273, interrupts the circuit for the lock-pulse relay R280 which also restores. Incident to the restoration of the lock-pulse relay R280, at its contacts 281, it completes a circuit from ground by way of the contacts 222, 281, 341, 443, 532, 452, 357 and 366, the lower winding of the monitoring relay R330 and the resistor 338, to battery. Upon operating the relay R330 prepares, at its contacts 337, a locking circuit for its upper winding which is completed by way of the contacts 353, 272 and 222 as soon as the line relay R270 reoperates at the end of the first digit "1." As a further result of the operation of the line relay R270 at the end of the suffix digit "1," at its contacts 272, it recompletes the holding circuit including the contacts 312' for retaining the release control relay R310 in its operated position. Also, at its contacts 273, the relay R270 prepares a point in the circuit for the lock-pulse relay R280 but, inasmuch as the conductor C369 is not grounded at the present time, the lock-pulse relay R280 remains in its restored position. As a further result of the operation of the monitoring relay R330, at its contacts 331, it interrupts the circuit over which the audible busy tone signal is transmitted to the calling toll operator and, at its contacts 333 and 335, it connects the calling toll operator's loop circuit, including the conductors C41 and C42, by way of the contacts 261 and 263, 371 and 373, the condensers 378 and 379, and the wipers 581 and 582, to the conductors of the busy called line and thus enables the toll operator to converse with the subscribers involved in the talking connection over the busy called line. The toll operator may then inform the busy subscribers that they should now hang up their receivers in order to permit a toll call to be extended to a subscriber on the called party line, or the operator may allow the subscribers on the busy called line to continue their conversation and wait for them to disconnect. Finally, at its contacts 336, the relay R330 completes an obvious circuit for operating the seizure relay R410. Upon reoperating the seizure relay R410, at its contacts 411, interrupts the previously described circuit for controlling the answer relay R320 to transmit the visual flashing signal to the calling toll operator; at its contacts 413 and 414, it transfers the winding of the busy test relay from the previously traced locking circuit, including ground at the contacts 524, to the C wiper 583 which is grounded so long as the called line remains in a busy condition. In view of the foregoing it will be understood that the busy test relay R350 remains in its operated position so long as the called line remains busy and, in turn, maintains the monitoring relay R330 in its operating position, at its contacts 353; and the relay R330, at its contacts 336, retains the seizure relay R410 in its operated position.

When the subscribers involved in the connection on the busy called line replace their receivers upon their associated switchhooks, the busy called party line becomes available for further calls. More particularly, as soon as the called party line is released the busy marking ground potential is removed from the bank contact engaged by the C wiper 583 and battery potential is substituted in place thereof through the winding of the cutoff relay (not shown) of the line circuit individual to the called party line. As soon as ground potential is removed from the contact engaged by the C wiper 583 the previously traced circuit for retaining the busy test relay R350 in its operated position is interrupted, and this relay now restores to normal. Upon restoring the relay R350, at its contacts 353, interrupts a point in the previously traced locking circuit for the upper winding of the monitoring relay R330 and, at its contacts 357, it interrupts a point in the previously traced initial energizing circuit for the lower winding of the monitoring relay R330. Finally, at its contacts 356, the relay R350 prepares a point in the circuit for the idle test relay R520. As soon as the abovementioned circuits for the upper and lower windings of the monitoring relay R330 are interrupted, the relay restores to normal and, at its contacts 336, interrupts the previously traced circuit for the upper winding of the seizure relay R410, which slowly restores to normal. As a further result of the operation of the monitoring relay R330, at its contacts 333 and 335, it interrupts the circuit, including the negative and positive wipers 581 and 582, whereby the calling toll operator monitored the busy called line. Finally, at its contacts 332 and 334, the relay R330, prepares the circuits for operating the answer relay R320 when the called subscriber answers.

The seizure relay R410 now restores and, at its contacts 412, completes the circuit for the idle test relay R510 which may be traced from the battery potential, which is now applied to the C wiper 583 through the winding of the cutoff relay of the called line, as noted above, by way of the conductor C101, the contacts 412, the lower winding of the idle test relay R520 and the contacts 232, 356, 342 and 524, to ground. The idle test relay R520 immediately operates and, at its contacts 528, completes a locking circuit for itself which includes its upper winding and the grounded conductor C100. As a further result of the operation of relay R520, at its contacts 525, it applies ground potential by way of the contacts 412, the conductor C101, and the C wiper 583 to the winding of the cutoff relay of the line circuit individual to the called party line, thereby to retain the cutoff relay in its operated position and to mark the called party line as busy to all other connectors having access thereto. At its contacts 521 and 523, the relay R520 prepares the circuits whereby ringing current is transmitted over the negative or positive wiper 581 or 582, in the manner previously described, and, at its contacts 522, it prepares a point in the previously traced circuit whereby a ring-back tone signal is transmitted to the calling toll operator. Finally, at its contacts 521', the relay R520 completes the previously described circuit, including the PU-1 conductor C555, for operating the dial tone and pickup relay R420 at the beginning of a ringing code cycle.

The remaining operations of the connector, whereby the selected ringing code is transmitted to signal the desired called subscriber at substation B1, are exactly the same as have been described previously. As soon as the called subscriber at substation B1 answers the call the ring cutoff relay R470 and the ring cutoff slave relay R460 operate in the previously described manner. The ring cutoff slave relay R460 upon operating, at its contacts 461 and 465, disconnects the circuit whereby the ringing code signal is transmitted to the called line and, at its contacts 462 and 466, it completes the previously traced direct current circuit whereby the answer relay R320 is operated over the called subscriber loop circuit. Upon operating the answer relay R320, at its contacts 321 to 324, inclusive, reverses the current flow over the conductors C41 and C42, thereby to give the toll operator at the central office the usual answering supervisory signal. The conversation between the toll operator at the central office and the called subscriber at substation B1 may now take place.

During conversation the connector 200 is retained in its operated position under control of the line relay R270 and the control relay R360 is prevented from operating due to the shunting ground potential applied to the conductor C43. During conversation the line relay R270, the release control relay R310, the answer relay R320, the release control slave relay R340, the minor switch off-normal relay R430, the vertical transfer relay R440, the rotary disconnect relay R450, the ring cutoff slave relay R460, the idle test relay R520 and the rotary transfer relay R530 are retained in their operated positions. These relays are restored to normal, in the manner previously described, as soon as the toll operator at the central office releases the connection by interrupting the loop circuit over which the line relay R270 is retained operated and by removing ground potential from the conductor C43. More specifically, the release of the switching apparatus involved in the connection is entirely under the control of the central office toll operator.

In view of the foregoing description of the operation of the connector 200 it will be understood that the toll operater may control the apparatus to camp on a busy called line and to transmit the ringing signal of the desired called subscriber as soon as the line becomes idle, by dialing a suffix digit "1" after the four digits of the directory number have been dialed. In the event that the called subscriber line is idle when the wipers of the connector are advanced into engagement therewith at the end of the third dialed digit, the C wiper 583 will encounter battery potential instead of a busy marking ground potential. Consequently, the busy test relay R350 will not operate at this time and the seizure relay R410 will restore to normal. Upon restoring the seizure relay R410, at its contacts 412, completes the previously described circuit for operating the idle test relay R520. The latter relay, at its contacts 528, completes a locking circuit for itself, which includes its upper winding, to the grounded conductor C100; also, at its contacts 525, it applies ground potential, by way of the contacts 412, the conductor C101 and the C wiper 583, in order to cause the operation of the cutoff relay (not shown) individual to the called party line. Also, the ground potential applied to the wiper 583 marks the called party line busy to other connectors having access thereto. As a further result of the operation of the idle test relay R520, at its contacts 521 and 523, it prepares points in the circuit for transmitting the selected ringing code signal to the called party line; it prepares, at its contacts 522, a point in the circuit for transmitting a ring-back tone signal to the calling toll operator; and it prepares, at its contacts 521', a point in the circuit for subsequently controlling the dial tone and pickup relay R420 from the PU-1 conductor C555. Since the called party line has been marked as busy to all other connectors having access thereto, the toll operator may refrain from dialing the final ringing code selecting digit into the connector until she has ascertained whether the calling subscriber whose line terminates in the central office toll switchboard is ready to converse with the desired called subscriber. More specifically, if the present connection is a delayed toll call the toll operator obtains the original calling subscriber in the connection and then dials the last digit into the connector 200 in order to signal the desired called subscriber at substation B1.

During the time the operator has marked the desired called line as busy to all other connectors having access thereto, and prior to the time she dials the final or fourth digit, any subscriber on the called party line may remove the receiver at his telephone substation. In order to signal this condition to the toll operator the connector has been arranged to reverse the current flow over the conductors C41 and C42 and to switch through the connector to the called line in order to enable the operator to converse with the subscriber who has removed his receiver. More particularly, the removal of the receiver at any substation on the called party line completes a circuit for operating the ring cutoff relay R470. This circuit may be traced from ground by way of the contacts 513, 465 and 523, the wiper 582, the loop circuit including the called party line and the substation at which the receiver has been removed, and returning by way of the wiper 581, the contacts 521, 461 and 511, the winding of the ring cutoff relay R470 and the contacts 425, one branch extending to the winding of the rotary magnet 490, to battery and the other branch extending by way of the contacts 451' and the lower winding of the seizure relay R410, to battery. The ring cutoff relay R470 operates over this circuit but, due to its resistance, the rotary magnet 490 and the seizure relay R410 do not operate at the present time. Upon operating the ring cutoff relay R470, at its contacts 471, completes a circuit from the grounded conductor C100 by way of the contacts 542 and 471 and the winding of the ring cutoff slave relay R460 to battery, thereby to cause the operation of the latter relay. Upon operating the relay R460, at its contacts 468, completes a locking circuit for itself which is independent of the contacts 471 and, at its contacts 461 and 465, it interrupts points in the previously traced circuit for operating the ring cut off relay R470, which now restores to normal. As a further result of its operation the relay R460, at its contacts 462 and 466, completes a circuit for operating the answer relay R320 over the previously traced circuit including the substation at which the receiver has been removed from the associated switchhook. The answer relay R320 upon operating, at its contacts 321 to 324, inclusive, reverses the current flow over the conductors C41 and C42 in order to transmit an answering supervisory signal to the toll operator at the central office.

Upon noting the answering supervisory signal the toll operator converses with the subscriber on the party line that has removed his receiver from the switchhook of his associated telephone instrument. In the connector 200 the conversational circuit noted above includes the conductors C41 and C42, the contacts 261 and 263, 371 and 372, the condensers 378 and 379, the contacts 462 and 466, 521 and 523, and the wipers 581 and 582 which are in engagement with the contacts terminating the called party line. The toll operator may now inform the connected subscriber that she is holding the called partly line for the completion of a toll call to a particular called subscriber and may request the connected subscriber to replace his receiver upon the associated switchhook. When the said subscriber replaces his receiver upon the associated switchhook the above-traced circuit for operating the answer relay R320 is interrupted and the relay restores to normal. Upon restoring, the answer relay R320, at its contacts 321 to 324, inclusive, again reverses the current flow over the conductors C41 and C42 back to its original condition, thereby to transmit to the toll operator a disconnect supervisory signal, and thus informs the toll operator that she may now proceed to dial the final or fourth digit of the particular called subscriber directory number.

The toll operator now dials the final digit "3" of the called subscriber directory number and in response thereto the line relay R270 and the lock-pulse relay R280 cooperate, in the manner described hereinbefore, to transmit three pulses to the minor switch stepping magnet 574 and, in multiple therewith, to the transfer control relay R540. As soon as the transfer control relay R540 operates in response to the first pulse transmitted thereto, at its contacts 542, it interrupts a point in the holding circuit for the ring cutoff slave relay R460, which now restores to normal. Upon restoring the relay R460, at its contacts 468, interrupts a further point in its initial energizing circuit; at its contacts 462 and 466, it interrupts points in the previously traced conversational circuit between the toll operator and the called party line; and finally, at its contacts 461 and 465, it prepares further points in the circuit for signaling the particular called subscriber on the party line. In response to the three pulses transmitted to the minor switch stepping magnet 574 the wipers 571 and 577 of the minor switch 570 are positioned into engagement with the third contacts in the associated contact banks. Incident to the advancement of these wipers from their normal resting positions, the minor switch off-normal contacts 557 are closed thereby to complete the previously traced circuit for operating the minor switch off-normal relay R430, and the minor switch off-normal contacts 572 are closed in order to prepare a point in the incomplete circuit for the minor switch release magnet 573. Shortly after the last pulse of the digit "3" is transmitted to the transfer control relay R540, the relay restores to normal and, at its contacts 542, now completes a circuit from the grounded conductor C100 by way of the contacts 542, 444, 427 and 435, thereby to operate the vertical transfer relay R440. Upon operating the relay R440, at its contacts 446, completes a locking circuit for its lower winding which includes the contacts 455', the minor switch off-normal contacts 557 and the grounded conductor C100. The relay R440, at its contacts 444, interrupts its initial energizing circuit and, at its contacts 443, it completes the circuit whereby the dial tone and pickup relay R420 may be controlled over the PU-1 conductor C555. In response to a ground pulse transmitted over the PU-1 conductor C555 at the beginning of a ringing code cycle the relay R420 operates in the manner previously described to complete, at its contacts 424, the previously described circuit whereby the third ringing code signal may be transmitted over the called party line to signal the desired called subscriber and, at its contacts 421, it completes the circuit whereby a ring-back tone signal is transmitted to the toll operator.

When the called subscriber at substation B1 answers the call the ring cutoff relay R470 and the ring cutoff slave relay R460 operate, in the manner previously described, to terminate the transmission of ringing current and to complete the previously described circuit whereby the answer relay R320 is operated in order to give an answering supervisory signal to the toll operator. Conversation between the toll operator at the central office and the called subscriber at substation B1 may now take place and the operator may withdraw from the connection after she has completed the same between the particular calling subscriber whose line is terminated at her switchboard and the called subscriber at substation B1. The talking battery for the called end of the connection is supplied through the windings of the answer relay R320 and the talking battery for the calling end of the connection is supplied through the windings of the line relay R270.

When the called subscriber at substation B1 hangs up his receiver the loop circuit including the windings of the answer relay R320 is interrupted, thereby to cause the relay to restore and transmit, at its contacts 321 to 324, inclusive, the usual disconnect supervisory signal to the toll operator at the central office. The toll operator may now release the apparatus involved in the connection by interrupting the loop circuit including the conductors C41 and C42, thereby to cause the restoration of the line relay R270, and by removing the ground potential from the conductor C43. The removal of ground potential from the conductor C43 causes the finder 300 to restore to normal and the restoration of the line relay R270 causes the connector 200 to restore to normal, all in the same manner described hereinbefore in connection with the description of operation thereof when a regular calling subscriber disconnects.

In the foregoing description of operation of the connector 200 it was assumed that the toll operator at the central office completed a connection to the subscriber at substation B1. In the event the toll operator desires to extend a connection over any one of the groups of trunks extending to the automatic suboffices by dialing the digit "7," "8" or "9," the operation of the connector 200 is exactly the same as has been described previously when a regular subscriber dials the single digit indicative of any one of the said groups of trunks. Attention is directed, however, to the fact that the control relay R360 is not operated when the connection is extended by the toll operator and therefore the conversation timing facilities provided in the connector 200 will be disabled. Futhermore, since automatic trunk hunting facilities are provided in the event the single digit "7," "8" or "9" is dialed into the connector the monitoring facilities, whereby the toll operator could cut in on a busy called line, are disabled when a connection is extended to any one of the group of trunks terminating in a suboffice.

RESTRICTED SERVICE

Before proceeding with the detailed description of operation of the restricted service facilities provided in the system, a brief explanation will be given of the alternative arrangements for imposing different restrictions on the various subscriber lines of the system. The various groups of trunks extending to the suboffices and the central office are selected by dialing the single digit "7," "8," "9" or "0," as previously described. These trunk groups have been described as being accessible to all of the local subscribers of the present system. It should be understood that these trunk groups are also accessible to the various subscribers in the suboffices by way of the incoming trunks which interconnect the suboffices, as previously noted, and which terminate in the banks of the finder 300. In addition to the foregoing, the toll trunks interconnecting the instant local office with the central office also terminate in the banks of the finder 300 to enable the central office toll operator to establish connections with the local subscribers, as previously described. Furthermore, the toll operator may control the connector 200 in order to select an idle trunk in any one of the trunk groups extending to the various suboffices and complete connections to the subscriber lines terminating in the selected suboffice. It may be desirable in certain telephone networks to prevent certain subscribers in the illustrated local exchange from extending connections to one or more of the interconnected suboffices. These subscribers are classified as restricted service subscribers since they are restricted from extending free calls to said certain suboffices, whereas other subscribers that are classified as non-restricted subscribers may extend free calls to such offices. Restricted service subscribers desiring to complete connections to the restricted suboffices must first call the central office toll operator in the manner previously described and the toll operator, in turn, will then complete the desired connection either over direct trunks interconnecting the central office and the said restricted suboffice, in the event such trunks are provided, or by completing the connection back through the switching apparatus provided in the instant local exchange and then by way of the restricted trunks extending to the restricted suboffice. In this manner the toll operator may assess a charge against the restricted calling subscriber, in a well known manner.

In the present system two alternative arrangements for restricting the subscribers from extending calls to the various suboffice trunk groups have been provided. The first arrangement includes the provision of a pair of normal post springs 255 which are illustrated in the dotted rectangular box 275 (Fig. 2) and are arranged to be operated only when the wipers 531 to 534, inclusive, of the connector 200 are elevated in a vertical direction to a level of the associated bank contacts terminating the group of restricted trunks and are retained in their closed position as the wipers of the connector are automatically rotated over the contacts of the selected level to search for an idle trunk in the selected group. With this arrangement only a single trunk group may be restricted from being used by subscribers having the restricted service classification imposed upon their telephone service.

Figure 2:
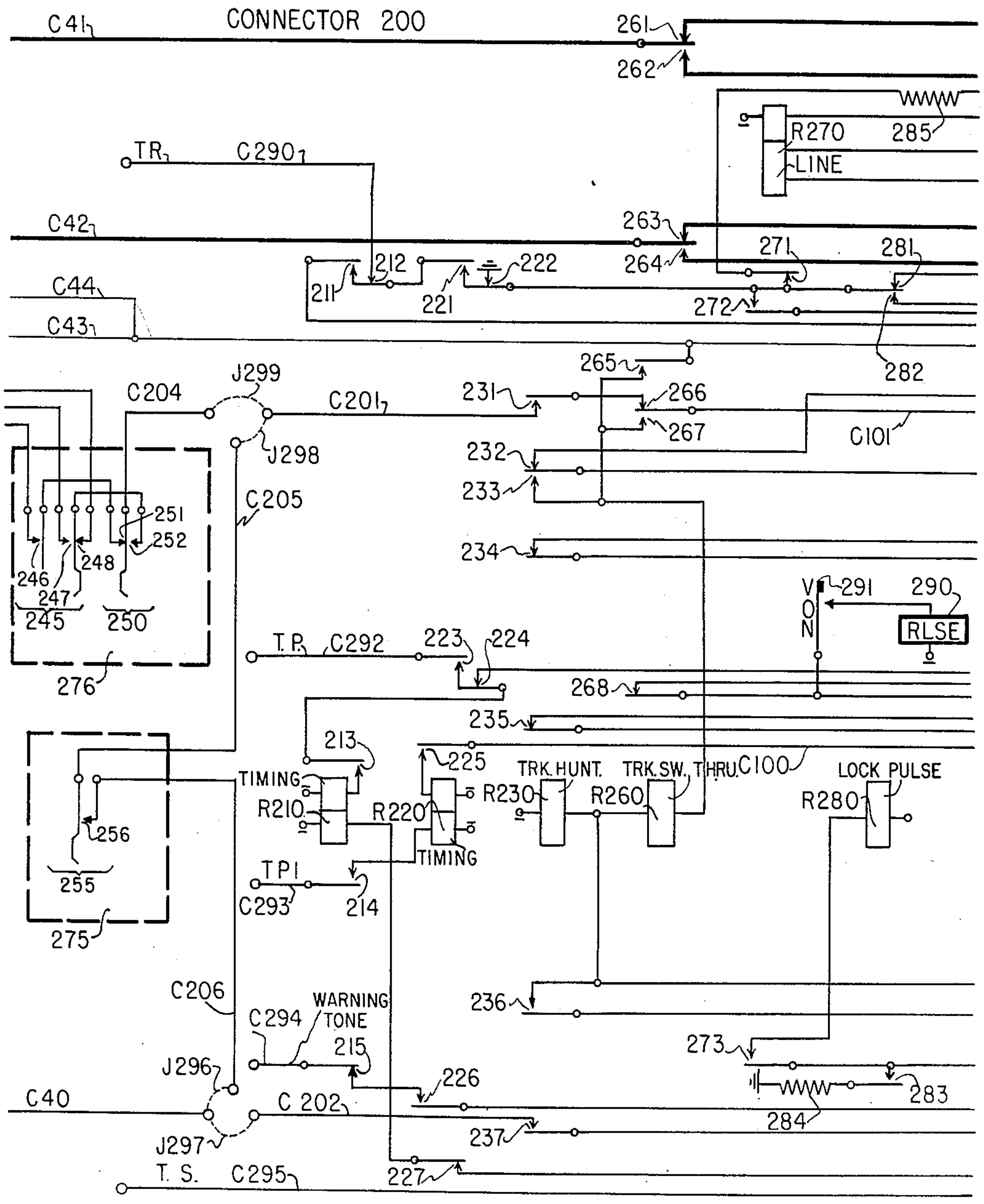
Figure 3:
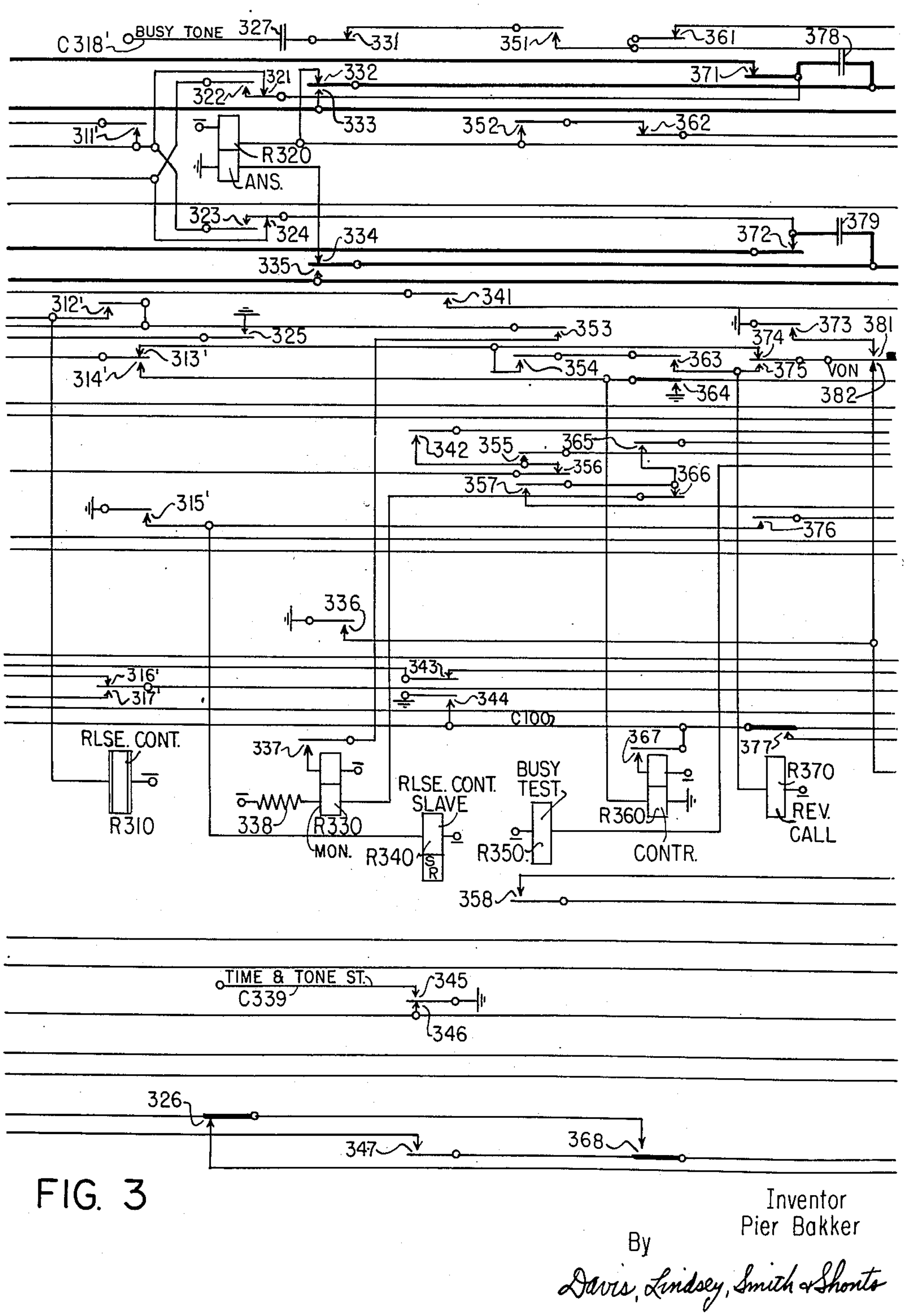
Figure 4:
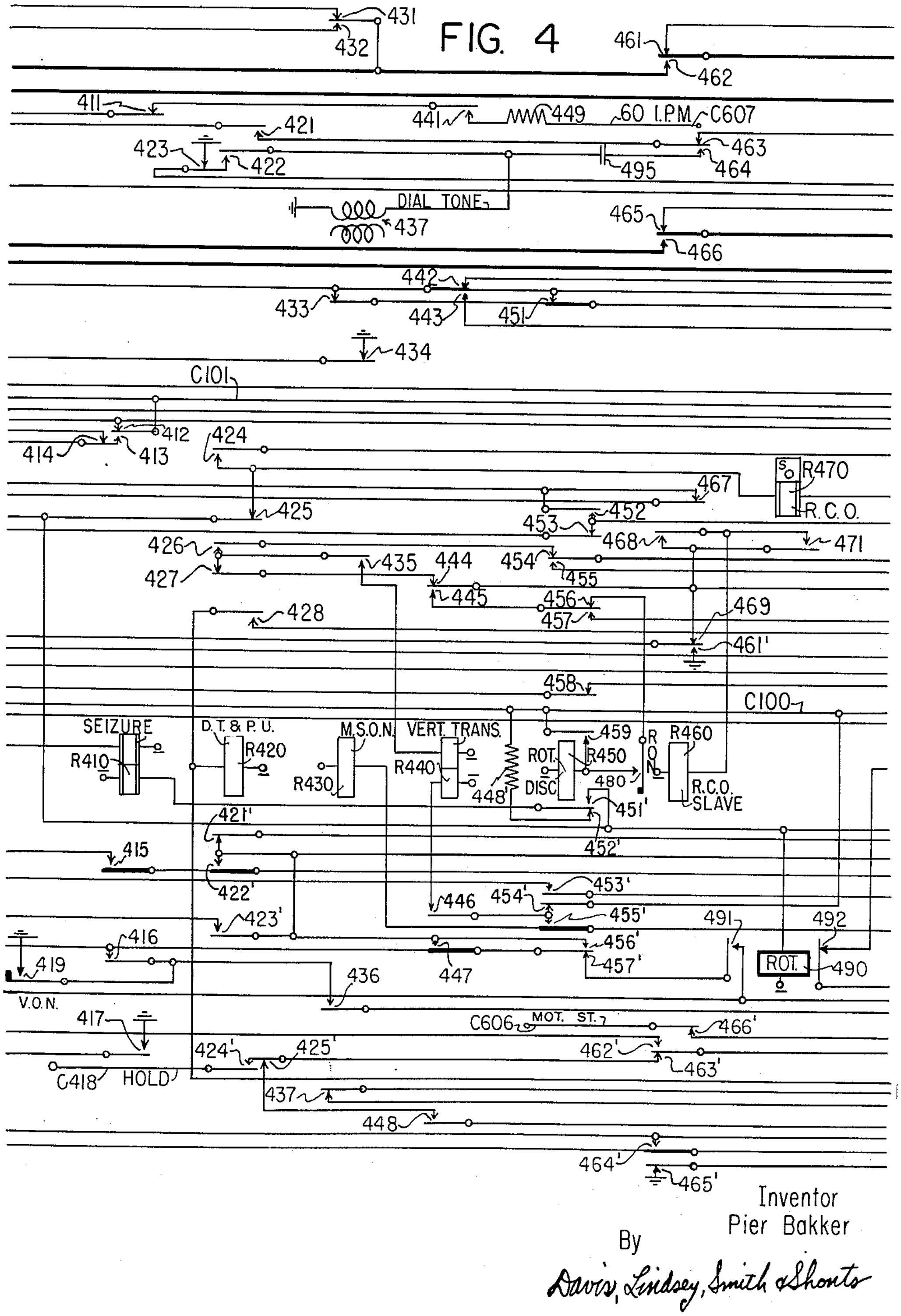

In the alternative arrangement for providing restricted service facilities in the connector 200, two sets of normal post springs are provided, as is illustrated in the dotted rectangular box 276 (Fig. 2). The set of normal post springs 250 is provided and arranged to be actuated when the wipers of the connector 200 are elevated to a level in which one of the groups of trunks extending to the suboffices is selected in response to the dialing of a single digit; the set of normal post springs 245 is provided and arranged to be actuated when the wipers of the connector are elevated in a vertical direction to select a second group of trunks extending to a second suboffice; and the two sets of normal post springs 250 and 245 are arranged to be actuated when the wipers of the connector are elevated in the vertical direction to select a third group of trunks extending to a third suboffice. When the alternative arrangement described immediately above is utilized it is also necessary to provide the restricted service network 10 comprising the relays R125, R130, R135, and R140, illustrated in Fig. 1. When the sets of normal post springs 245 and 250 are utilized in combination with the restricted service network 10, seven combinations of restrictions may be imposed upon the different subscriber lines when only three different groups of suboffice trunks are accessible to the connector 200. The seven different combinations of restrictions are obtained by operating the relays R125, R130, R135 and R140 singly or in various combinations. Depending upon the particular relay or relays operated, the restricted service conductors C102 to C104, inclusive, are grounded individually or in combination to control the connector 200 in the event the calling subscriber, who has the corresponding restriction imposed upon his service, dials a group of restricted trunks.

In order to describe the operation of the system when the simplified form of restricted service facilities including the normal post springs 255 is utilized, it will be assumed that the group of suboffice trunks terminating in the first level of bank contacts of the connector 200, and having the single directory digit "7," is to be restricted. It will also be assumed that the subscribers at substations A1 to A20, inclusive, are to be restricted from extending connections over this restricted group of trunks. Referring now to Fig. 1, it is noted that the finder 300 is provided with wipers 311 to 314, inclusive, which engage the contacts in the associated contact bank terminating the line conductors C31, C32 and C33 of the illustrated party line. The three conductors C31 to C33, inclusive, extend to the line circuit 20 and the wipers 312, 313 and 314 of the finder 300 engage the contacts in the associated contact bank terminating the said conductors. The additional wiper 311, however, engages a contact in its associated contact bank which will be jumpered by way of the jumper J30' to the grounded terminal 142, since the illustrated party line is a restricted line. Referring now to Fig. 2, attention is directed to the fact that when the simplified form of restricted service is employed in the connector 200, as mentioned above, the normal post springs 255 are arranged to be actuated when the wipers 581, to 584, inclusive, of the connector are positioned opposite the first level of associated bank contacts. Furthermore, the conductor C40 is connected by way of the jumper J296 to the conductor C206 and the jumper J297 is omitted; and the conductor C201 is connected by way of the jumper J298 to the conductor C205 and the jumper J299 is omitted.

With the system arranged in the above-described manner, initiation of a call by a calling subscriber on the party line C31—C32 will cause the line circuit 20 and the finder 300 to operate, in the manner previously described, to extend the calling line loop circuit through to the line relay R270 of the connector 200. If the calling subscriber should now dial the single digit "7" in an attempt to complete a connection over the restricted group of trunks, the line relay R270 and the lock-pulse relay R280 will operate in the manner previously described, whereby six pulses are transmitted to the minor switch stepping magnet 574, thereby to advance the wipers 571 and 577 into engagement with the sixth set of contacts in the associated contact banks. A circuit is then immediately completed, in the manner previously described, to cause the last or seventh pulse of the digit "7" to be transmitted to the vertical magnet 560. In response to the single pulse transmitted to the vertical magnet 560 the wipers 581, to 584, inclusive, are advanced in a vertical direction to a position opposite the first level of associated bank contacts. As soon as the wipers are moved from their normal resting positions the vertical off-normal contacts 419 are closed, thereby to complete the previously traced circuit for operating the trunk hunting relay R230. The latter relay now operates and, at its contacts 236, completes a locking circuit for itself by way of the contacts 416 and the vertical off-normal contacts 419. Shortly after the end of the seventh pulse the transfer control relay R540 restores to normal and completes the previously traced circuit for operating the rotary transfer relay R530. The relay R530 upon operating locks itself to the grounded conductor C100. As a further result of the restoration of the transfer control relay R540, at its contacts 543, it interrupts a point in the locking circuit for the dial tone and pickup relay R420. Before the last-mentioned relay restores to normal, the previously traced circuit is completed for operating the rotary interrupter relay R510 whereby the rotary magnet 490 operates to cause the wipers of the connector 200 to be rotated into engagement with the first set of contacts in the selected first level. In addition to rotating the wipers into engagement with the first set of contacts in the selected level the rotary magnet, at its contacts 492, interrupts the previously traced circuit for the rotary interrupter relay R510 which now restores and, at its contacts 515, interrupts the circuit for the rotary magnet 490 which also restores. In the normal operation of the connector 200 a test will now be made to determine whether the first trunk in the selected group is busy. However, inasmuch as the particular calling subscriber is a restricted service subscriber, an artificial busy marking ground potential will be placed upon the C wiper 583, thereby to cause the wipers 581 to 584, inclusive, to be automatically rotated to the bank contacts terminating the last trunk in the selected group regardless of the actual idle or busy condition of the various trunks.

When the wipers of the connector are raised to a position opposite the first level of associated bank contacts the normal post springs 255 are actuated to close the contacts 256 and the circuit is completed for the trunk hunting relay R230, as explained above, thereby to cause the operation of the latter relay. The circuit is now completed from the grounded terminal 142 by way of the jumper J30', the wiper 311 of the finder 300, the conductor C40, the jumper J296, the conductor C206, the normal post contacts 256, the conductor C205, the jumper J298, the conductor C201, the contacts 231 and 266, the conductor C101, and the wiper 583. As soon as ground potential is applied to the conductor C101 a circuit is completed, by way of the contacts 413, for operating the busy test relay R350. Incident to its operation the relay R350, at its contacts 351, completes the previously traced circuit including the contacts 231, 351 and 432, whereby the busy tone signal is transmitted to the calling subscriber.

When the wipers 581 to 584 of the connector are rotated into engagement with the first set of contacts in the selected first level, the rotary off-normal contacts 480 are closed to prepare a point in the circuit for the rotary disconnect relay R450. At the end of the last pulse of the single digit "7" the transfer control relay R540 restores, as has been previously noted, and, at its contacts 542, now completes the circuit for energizing the rotary disconnect relay R450. Upon operating the relay R450, at its contacts 459, locks itself to the grounded conductor C100. As a further result of its operation the relay R450, at its contacts 453', prepares a circuit for reoperating the rotary interrupter relay R510 as soon as the busy test relay R350 is operated to close its contacts 358. The last-mentioned circuit may be traced from the grounded contact engaged by the EC wiper 584 by way of the contacts 552, 453', 358, 415, 517 and 492 and the lower winding of the rotary interrupter relay R510, to battery. The rotary interrupter relay R510 now reoperates and, at its contacts 515, completes the previously traced circuit for operating the rotary magnet 490 and for retaining the seizure relay R410 in its operated position. The rotary magnet 490 upon operating advances the wipers 581 to 584 into engagement with the second set of bank contacts in the selected first level and, at its contacts 492, it interrupts the circuit for the rotary interrupter relay R510, which again restores to normal. Regardless of the idle or busy condition of the trunks terminating in the selected first level of the connector 200, the busy test relay R350 is retained in its operated position over the circuit including the grounded conductor C101, and the rotary interrupter relay R510 and the rotary magnet 490 interact to advance the wipers of the connector step by step over the selected first level. When the last trunk in the group is encountered the rotary step-by-step movement of the wipers is terminated, in the manner previously explained, and the busy test relay R350 is retained in its operated position, thereby to continue to transmit the busy tone signal to the calling subscriber.

In view of the foregoing it will be understood that the calling subscriber is prevented from extending calls over the group of trunks terminating in the first level of the connector 200 because the busy test relay R350 is retained in its operated position. The connector 200 automatically rotates over the contacts of the selected first level but is prevented from switching through in the usual manner to seize an idle trunk due to the operated condition of the busy test relay R350. Inasmuch as the restricted calling subscriber receives busy tone signal when an attempt is made to extend a connection over a restricted group of trunks, the subscriber will replace his receiver and cause the restoration of the apparatus utilized in the attempted connection, in the manner previously described.

The subscribers in the local exchange who do not have the restriction imposed upon their telephone service do not have their bank contacts, which are accessible to the wiper 311 in the finder 300, jumpered by means of a jumper, such as J30′, to the grounded terminal 142. Consequently, when such unrestricted subscribers extend connections to the group of trunks terminating in the first level of the connector 200, the normal post springs 255 are operated in the previously described manner but no ground potential is applied to the conductor C101 and the connector will operate to select automatically an idle trunk in the selected group of trunks.

Consideration will now be given to the restricted service facilities of the modified form which includes the normal post springs 245 and 250, illustrated in the dotted rectangular box 276, and the restricted service network 10 which includes the four relays R125, R130, R135 and R140. For the purpose of describing the operation of the restricted service apparatus referred to above, it will be assumed that the normal post springs 245 are actuated when the wipers of the connector 200 are advanced in a vertical direction to a position opposite the first level terminating the first group of restricted trunks. The normal post springs 245 and 250 will be actuated when the wipers of the connector are elevated to a position opposite the second level terminating the second group of trunks, and the vertical normal post springs 250 will be actuated when the wipers are elevated to a position opposite the third level terminating the third group of restricted trunks. With the normal post springs arranged in this manner, it is necessary to connect the conductor C204 to the conductor C201 by means of the jumper J299, and the jumper J298 is omitted. Furthermore, it is also necessary to connect the conductor C40 to the conductor C202 by means of the jumper J297, and the jumper J296 is omitted. From the foregoing it will be understood that the setting of the indicated normal post springs after a trunk selecting digit has been dialed into the connector serves to indicate the particular trunk group which has been selected. Referring now to the restricted service network 10, it is noted that the four relays R125, R130, R135 and R140 are provided with the respective contacts 126, 131, 136 and 141, whereby the conductors C102, C103 and C104 may be grounded in order, respectively, to designate the three groups of trunks terminating, respectively, on the first, second and third levels of the connector. By way of example, it will be assumed that the first group of trunks is designated Restriction 1, the second group of trunks is designated Restriction 2, and the third group of trunks is designated Restriction 3. The various leads extending to the left of the four relays noted are marked respectively Restriction 1, Restriction 1–2, Restriction 2, Restriction 3, Restriction 1–2–3, Restriction 1–3, and Restriction 2–3. These leads are connected respectively to the correspondingly designated terminals of the terminal block 143 so that the contact in the associated contact bank accessible to the wiper 311 of any subscriber line may be jumpered to one of the terminals of the block 143 to impose the corresponding restriction or combination of restrictions on such subscriber lines.

In order to describe the operation of the restricted service facilities for the various trunk groups, it will be assumed that the party line C31—C32 is to be prevented from extending connections over the first and the second groups of trunks terminating in the first and the second levels of the connector 200. To impose this restriction upon the party line noted, the contact in the bank accessible to the wiper 311 of the finder 300, which is individual to the party line, will be jumpered by means of the jumper J30 to the terminal of the terminal block 143 which is designated Restriction 1–2. When a subscriber on the party line initiates a connection the line circuit 20 and the finder 300 will operate to complete the connection from the calling subscriber line to the connector 200. If the subscriber on the calling party line now dials the single digit "7" the connector 200 will position its wipers 581 to 584, inclusive, opposite the first level of associated bank contacts and the wipers will automatically rotate into engagement with the first set of contacts in the selected first level. During the above-mentioned operation of the connector 200, the seizure relay R410 and the trunk hunting relay R230 will be in their operated positions and the normal post springs 245 will be actuated to close the contacts 246 and 247 and to open the contacts 248. Incident to the operation of the relay R410, at its contacts 417, it applies ground potential by way of the contacts 237, the conductor C202, the jumper J297, the conductor C40, the wiper 311, the jumper J30, the Restriction 1–2 terminal, the lower winding of the relay R140 and, in multiple therewith, the lower winding of the relay R135, to battery. Upon operating the relay R140, at its contacts 141, applies ground potential to the Restriction 1 conductor C102 and the relay R135, at its contacts 136, applies ground potential to the Restriction 2 conductor C103. The ground potential applied to the conductor C102 is further extended by way of the normal post contacts 246 and 251, the conductor C204, the jumper J299, the conductor C201, the contacts 231 and 266, the conductor C101, the contacts 413 and the winding of the busy test relay R350, to battery. The busy test relay upon operating causes the busy tone signal to be transmitted to the calling subscriber and causes the previously described interaction between the rotary interrupter relay R510 and the rotary magnet 490, whereby the wipers of the connector are automatically rotated over the contacts of the selected level to the last trunk in the group, regardless of the idle or busy condition of any of the intermediate trunks. In this manner the subscribers on the party line C31—C32 are prevented from extending connections over the trunks terminated in the first level of the connector 200. Shortly after the last trunk in the group is selected the seizure relay R410 restores to normal, thereby to interrupt the circuit for the restricted service relays R135 and R140, which relays now restore to normal. The busy test relay R350, however, remains in its locked position and continues to transmit the busy tone signal to the calling subscriber until the connection is released, in the manner previously described.

If the subscriber should dial the single digit "8" designating the second group of trunks terminating in the second level of the connector 200, the restricted service relays R135 and R140 will be operated in the manner previously described, but in this case the ground potential applied to the Restriction 2 conductor C103 will be extended by way of the normal post contacts 247 and 252 in order to cause the operation of the busy test relay R350. Attention is directed to the fact that when the wipers are elevated to the second level of the connector 200 both the normal post springs 245 and 250 are actuated, thereby to close the contacts 246, 247 and 252 and to open the contacts 248 and 251. The busy tone signal is transmitted to the calling subscriber and the wipers of the connector are automatically rotated over the contacts of the selected level to engage the contacts terminating the last trunk of the group, regardless of its idle or busy condition. If the calling subscriber should dial the single digit "9" designating the third group of trunks terminating in the third level of the connector 200 the normal post springs 250 will be actuated to close the contacts 252 and to open the contacts 251. Furthermore, the restricted service relays R135 and R140 will be operated, in the manner previously described, to ground the Restriction 1 and the Restriction 2 conductors C102 and C103, but inasmuch as the normal post springs 245 have not been actuated no circuit is completed for the busy test relay R350 on this type of call. Consequently, the connector 200 operates in a normal manner to select an idle trunk in the group of trunks terminated in the third level.

From the foregoing it will be understood that, with the party line C31—C32 wired in the manner explained, the subscribers on the said party line cannot obtain access to the trunks of the first and second restricted trunk groups but can obtain access to the trunks of the third restricted group. It will also be understood that by changing the jumper J30 to any one of the remaining six terminals on the terminal block 143, any one, any two, or all three of the groups of trunks may be restricted so that the calling subscribers on the party line are prevented from extending connections over the three groups of trunks in accordance with the restriction imposed on the line. The manner in which service restrictions may selectively be imposed upon the other lines of the system will be clearly apparent from the above explanation of the various restrictions imposed upon the party line C31—C32.

*Reverting calls*

The illustrated finder-connector link comprising the finder 300 and the connector 200 is arranged so that reverting call connections may be established between subscriber substations served by the same party line by dialing the directory number of the desired called subscriber. In considering this type of call it will be assumed that a call is initiated by the subscriber at substation A1 which is to be extended to any subscriber served by the same party line conductors. It will also be assumed that the subscriber at substation A1 has removed his receiver and has dialed the four digits of the called subscriber directory number into the connector 200. The connector 200 is operated in the manner previously described in the setting up of a connection from the subscriber at substation A1 to the subscriber at substation B1 and, consequently, the respective wipers 581, 582 and 583 of the connector 200 are positioned into engagement with the bank contacts terminating the negative conductor C31, the positive conductor C32 and the connector normal conductor C34' extending from the line circuit 20. These conductors are individual to the party line to which the substations A1 to A20 are connected and, consequently, when a call is initiated thereon the line circuit 20 functions, in the manner described in the previously mentioned Lomax application, to apply ground potential to the conductor C34', thereby to mark the said calling party line as busy in the banks of all connectors having access thereto. Consequently, when the wiper 583 of the connector 200 is positioned into engagement with the associated bank contact terminating the conductor C34', the ground potential is encountered to indicate the busy condition of the calling line. This ground potential is extended by way of the conductor C101 and causes the previously described operation of the busy test relay R350. The busy test relay R350 upon operating, at its contacts 351, prepares the circuit for transmitting the busy tone signal to the calling subscriber. At the beginning of the fourth digit which controls the minor switch 570 to select the ringing code of the desired called subscriber on the busy calling line, the minor switch off-normal relay R430 operates in order to transmit the busy tone signal to the calling subscriber. At the end of the fourth digit the seizure relay R410 restores to normal and, at its contacts 414, completes the previously traced locking circuit for the busy test relay R350. Upon receiving the busy tone signal the calling subscriber at substation A1 replaces his receiver upon the switchhook of his associated telephone instrument and thus interrupts the previously described loop circuit extending from the calling party line to the line relay R270, whereupon the latter relay restores to normal.

Incident to the restoration of the line relay R270, at its contacts 273, it interrupts the circuit for the lock-pulse relay R280 which also restores to normal. As soon as both the line relay R270 and the lock-pulse R280 are restored the multiple circuit including the contacts 272 and 282 is interrupted, thereby to cause the release control relay R310 slowly to restore to normal. At its contacts 313', the relay R310 prepares a point in a circuit, traced hereinafter, for operating the reverting call relay R370 and, at its contacts 315', it interrupts a point in the energizing circuit for the release control slave relay R340. The relay R340 remains in its operated condition for a short time interval after the release control relay R310 restores, and during this interval completes the above-mentioned circuit for the reverting call relay R370, which may be traced from ground by way of the contacts 222, 281, 341, 443, 532, 452, 357, 365 and 412, the conductor C101, the wiper 583 and the engaged contact in the associated contact bank terminating the conductor C34' extending to the line circuit 20, thereby to maintain the cutoff relay (not shown) in the line circuit 20 operated. This ground potential is further extended by way of the conductor C33, the wiper 314 of the finder 300, the conductor C43, the contacts 313', 354 and and 363 and the winding of the reverting call relay R370, to battery. The relay R370 now operates and, at its preliminary make contacts 376, completes a holding circuit for the release control slave relay R340 before it has had time to restore to normal. The holding circuit for the relay R340 may be traced from ground by way of the contacts 222, 281, 341, 443, 532, 452, 467 and 376 and the winding of the relay R340, to battery. The last-mentioned cricuit retains the connector 200 in its operated position despite the fact that the calling subscriber at substation A1 has released. As a further result of the operation of the reverting call relay R370, at its contacts 373 and 375, it completes a locking circuit for itself which includes the vertical off-normal contacts 381. The relay R370, at its contacts 377, completes a circuit including the grounded conductor C100 for operating the idle test relay R520. The latter relay upon operating, at its contacts 528, locks itself to the grounded conductor C100. The relay R520, at its contacts 521', prepares a circuit whereby the dial tone and pickup relay R420 is operated when the next pulse is transmitted over the PU-1 conductor C555 and, at its contacts 521 and 523, prepares the circuit whereby the selected code ringing signal is transmitted to the called subscriber on the calling party line. Finally, at its contacts 524, the relay R520 interrupts a point in the locking circuit for the busy test relay R350, thereby to cause the latter relay to restore. Upon restoring the busy test relay R350, at its contacts 357, interrupts the circuit whereby direct ground potential was applied to the wiper 583. The removal of ground potential from this wiper causes the restoration of the cutoff relay (not shown) individual to the called party line and the removal of ground potential from the conductor C43. As soon as the dial tone and pickup relay R420 is operated over the PU-1 conductor C555, at its contacts 424, it completes the previously traced circuit whereby the selected ringing code signal is transmitted.

When the called subscriber on the same party line with the calling subscriber at substation A1 answers the call a direct current loop circuit is completed whereby the ring cutoff relay R470 operates, thereby to cause the operation of the ring cutoff slave relay R460, in the manner previously described. The operation of the ring cutoff slave relay R460 terminates the transmission of the selected ringing code by interrupting the ringing circuit, at its contacts 461 and 465. Relay R460, at its contacts 467, interrupts the previously traced holding circuit for the release control slave relay R340 which now slowly restores to normal. Incident to the restoration of the relay R340, at its contacts 344, it removes the holding ground potential from the conductor C100, thereby to cause the restoration of the various relays in the connector 200 which are locked thereto. As a further result of the restoration of the relay R340, at its contacts 343, it completes a multiple circuit whereby the minor switch release magnet 573 and the Strowger switch release magnet 290 are operated to restore the wipers 571 and 577 of the minor switch 570 and to restore the wipers 581 to 584, inclusive, of the connector 200 to their normal resting positions. When the wipers 581 to 584, inclusive, are restored to normal the vertical off-normal contacts 381 are opened thereby to interrupt the circuit for the reverting call relay R370 which also restores. Further release of the connector 200 and the finder 300 is exactly the same as has been described hereinbefore and when the release is completed the finder 300 and the connector 200 may be utilized in extending additional connections. The calling subscriber at substation A1 and the called subscriber on the same party line may now converse in the usual manner, it being understood that talking battery is supplied to the connection through the winding of the line relay (not shown) of the line circuit 20 individual to the party line.

FORCED RELEASE AND CONVERSATION TIMING

The connector 200 is provided with timing relays R210 and R220 which function to forcibly release the connector in the event (1) the calling subscriber fails to dial any digits after the connector has been seized, (2) the subscriber dials an incomplete directory number, (3) the called subscriber fails to answer the connection within a predetermined elapsed time interval, and (4) the conversational connection between two subscribers is maintained for a predetermined elapsed time interval. Before discussing the detailed operation of the timing relays R210 and R220, it should be understood that these relays begin to function as soon as the connecter is seized and are restored to their normal positions after each digit is dialed, provided each succeeeding digit is dialed within a predetermined time interval. It should also be understood that the operation of the timing relays R210 and R220 may be rendered ineffective to time the conversation of a connection when such a connection originates at a toll operator position. More specifically, when the connector 200 is seized by a regular subscriber the control relay R360 is retained in its operated position but when the toll operator seizes the connector, in the manner previously described, the control relay R360 is shunted and is thus prevented from operating.

When the connector 200 is seized by a regular subscriber the relays R270, R280, R310, R340, R360, R410 and R420 are operated in the manner previously explained. The release control slave relay R340, in operating, closes its contacts 347, whereupon a circuit is prepared for energizing the timing relay R210. Ground pulses are periodically applied to the time start conductor C295 by a timer (not shown) at approximately two minute intervals, so the next time a ground pulse is applied to this conductor, after operation of the relay R340, a circuit is completed by way of the contacts 539, 326 and 227 for energizing the lower winding of the relay R210. Upon operating the relay R210, at its contacts 213, completes a locking circuit for its upper winding, which includes the contacts 224, 469 and 542 and the grounded conductor C100. Also upon operating the relay R210, at its contacts 214, prepares a circuit for the lower winding of the timing relay R220 which includes the time pulse 1 conductor C293, which conductor is momentarily grounded approximately two minutes after the conductor C295 is grounded. It should be noted that the above-traced locking circuit for energizing the upper winding of the timing relay R210 includes the contacts 542 on the transfer control relay R540. This relay is operated during the pulsing period of each digit dialed by the calling subscriber and, consequently, at the beginning of each digit, interrupts the locking circuit for the relay R210 to cause the restoration thereof. With this in mind it will be understood that the relay R210 will start a new time cycle each time a new digit is dialed into the connector 200, unless the calling subscriber fails to dial a new digit within a predetermined elapsed time interval of approximately two minutes. For example, if the calling subscriber should fail to dial the first digit into the connector 200 after it has been seized, at the end of approximately two minutes after the relay R210 has operated a momentary ground pulse will be applied to the time pulse 1 conductor C293 thereby completing an obvious energizing circuit for the lower winding of the timing relay R220. The relay R220 now operates and, at its contacts 225, completes a locking circuit including its upper winding and the grounded conductor C100. As a further result of its operation the relay R220, at its contacts 221 and 222, transfers the normal holding circuit for the release control relay R310 from direct ground, at the contacts 222, to a circuit including the contacts 221 and 211 and the grounded contacts 325. The last-mentioned contacts are not closed to apply ground potential to this circuit until the answer relay R320 has been operated under control of a called subscriber. In the present example it has been assumed that the calling subscriber has failed to dial; consequently no holding ground potential is now provided for the release control relay R310 and this relay now restores to normal. Upon restoring the relay R310, at its contacts 315', interrupts the circuit for the release control slave relay R340 which also restores to normal and, at its contacts 314', it disconnects the lower winding of the control relay R360 from the conductor C43. Incident to the removal of ground potential from the conductor C43, the finder 300 restores to normal and thus interrupts the loop circuit including the line relay R270 of the connector 200. Furthermore, the removal of ground potential from the conductor C43 locks out the calling subscriber line circuit, in a well known manner, until the calling subscriber thereon replaces his receiver. Incident to the restoration of the line relay R270 in the connector 200 the lock-pulse relay R280 restores to normal and, incident to the restoration of the release control slave relay R340, in the manner previously explained, the holding ground potential is removed from the conductor C100 thereby to cause the restoration of all relays locked to this conductor. Referring now to the timing relays R210 and R220, it is noted that removal of ground potential from the conductor C100 causes the restoration of the relay R220, and the restoration of this relay, at its contacts 223, interrupts the locking circuit for the relay R210 including the time pulse 2 conductor C292. The relay R210 now restores to normal and completes the restoration of the connector 200.

In the foregoing explanation it was assumed that the calling subscriber failed to dial any digits after the connector was seized. It should also be understood that the connector 200 will be forcibly released, in the manner explained above, if the calling subscriber delays more than two minutes between the dialing of each successive digit of the called subscriber directory number or in the event that the called subscriber fails to answer a call within two minutes.

With the above-mentioned timing arrangement a calling subscriber is prevented from monopolizing the finder 300 and the connector 200 for any extended period of time either due to the fact that he has failed to dial any digits, has failed to dial all the digits of a called directory number, has delayed too long in dialing successive digits of a number, or the called subscriber has failed to answer within a predetermined elapsed time.

It will now be assumed that the calling subscriber has seized the connector and has dialed the four digits of a called subscriber directory number, in the manner previously explained. The timing operations of the relays R210 and R220 will be performed as soon as the connector is seized and also after each digit dialed into the connector 200. If the various operations mentioned above are performed within the predetermined elapsed time interval noted, the locking circuit for the timing relay R210 will be interrupted, at the contacts 469, by the operation of the ring cutoff slave relay R460 when the called subscriber answers the call. Furthermore, the answer relay R320 will be operated in order to prepare, at its contacts 325, the previously mentioned alternate holding circuit for the release control relay R310. At this time the next ground pulse applied to the time start conductor C295 again completes a circuit for the lower winding of the timing relay R210. This circuit includes the contacts 347, 368 and 227 and the lower winding of the relay R210 to battery. Upon operating the relay R210 completes a locking circuit for its upper winding which includes the contacts 213, 224 and 261'. Approximately two minutes after the relay R210 is operated the ground pulse is applied to the time pulse 1 conductor C293, thereby to complete an obvious circuit for operating the timing relay R220. The latter relay upon operating, at its contacts 225, completes a locking circuit for its upper winding which includes the grounded conductor C100. Also upon operating the relay R220, at its contacts 221 and 222, transfers the normal holding ground potential for the release control relay R310 from the contacts 222 to the circuit including the contacts 221, 211 and 325. At its contacts 223 and 224, the relay R220 transfers the locking circuit for the upper winding of the relay R210 from ground at the contacts 461' to the time pulse 2 conductor C292 which will remain grounded for approximately two minutes after the momentary ground pulse appeared upon the time pulse 1 conductor C293. Finally, the relay R220, at its contacts 226, prepares a circuit for transmitting a warning tone signal to the calling subscriber and, at its contacts 227, it interrupts a point in the circuit for the lower winding of the relay R210. After the elapse of an additional two minutes the ground potential is removed from the time pulse 2 conductor C292, thereby to interrupt the locking circuit for the upper winding of the relay R210, which now restores to normal. Upon restoring the relay R210, at its contacts 211 and 212, transfers the previously mentioned holding circuit for the relay R310 from ground, at the contacts 325, to the time release conductor C290 which remains grounded for an additional two minutes. Finally, at its contacts 215, the relay R210 prepares a circuit including the warning tone conductor C294, the contacts 226, 262' and 521', and the winding of the dial tone and pickup relay R420, to battery. Shortly prior to the time that ground potential is removed from the time release conductor C290 two ground pulses are applied to the warning tone conductor C294, thereby to complete the above-mentioned circuit for the dial tone and pickup relay R420. This relay now operates momentarily two times and, at its contacts 421, transmits a dial tone signal to the calling and called subscribers. This circuit may be traced from ground by way of the upper winding of the dial tone transformer 437, the condenser 495, the contacts 464, 421 and 332, one branch extending by way of the contacts 462 and 521 and the wiper 581 to the called subscriber, and the other branch extending by way of the condenser 378, the contacts 371 and 261 and the conductor C41 extending to the calling subscriber. In this manner the calling and called subscribers involved in the connection receive two short pulses of the dial tone signal which serve as a warning tone to inform the subscribers that the connection is about to be forcibly released. Shortly after the warning tone signal has been transmitted the ground potential maintained on the time release conductor C290 is removed therefrom, thus interrupting the holding circuit for the release control relay R310 which now restores to normal. Upon restoring the relay R310 interrupts, at its contacts 315', the circuit for the release control slave relay R340 which also restores to normal. Upon restoring the relay R340, at its contacts 344, removes the holding ground potential from the conductor C100, thereby to cause the various relays which are locked to this conductor to restore to normal. Also, at its contacts 343, the relay R340 completes the circuit, traced hereinbefore, whereby the minor switch release magnet 573 is operated to cause the wipers 571 and 577 of the minor switch 570 to restore to normal and to cause the operation of the Strowger switch release magnet 290. The magnet 290 upon operating causes the wipers 581 to 584, inclusive, of the connector 200 to be restored to their normal vertical and rotary resting positions, in the manner previously described. Finally, at its contacts 314', the relay R310 interrupts the circuit including the lower winding of the control relay R360, thereby to remove ground potential from the conductor C43 and thus cause the restoration of the finder 300 and the lock-out operation of the line circuit 20 previously noted.

From the foregoing description of operation of the timing relays R210 and R220 it is apparent that the connector 200 will be forcibly released in the event that the subscribers involved in the connection fail to release the same within a predetermined elapsed time interval.

When the toll operator extends a connection to the connector 200 ground potential is forwarded over the conductor C43 in order to prevent the operation of the control relay R360, in the manner previously explained. If the toll operator fails to dial any digits into the connector 200 after she has seized the same, the timing relays R210 and R220 will function, in the manner previously described, to place a lock-out condition on the line circuit individual to the calling toll operator and to release the finder 300 and the connector 200, in the same maner as has been described above when the calling subscriber fails to dial after having seized the connector 200. These timing relays R210 and R220 also function, in the manner previously described, forcibly to release the finder 300 and the connector 200 in the event the toll operator fails to dial the second and third digits of the called subscriber directory number within the predetermined elapsed time interval. However, it should be noted that when the third digit is dialed into the connector 200 the rotary transfer relay R530 is operated and, at its contacts 539, interrupts a point in the circuit for operating the lower winding of the relay R210 over the time start conductor C295. In reviewing this circuit it should be understood that the release control slave relay R340 is in its operated position to complete a portion of the time start circuit, including the conductor C295; the control relay R360, the ring cutoff slave relay R460 and the answer relay R320 are in their deenergized positions; and the rotary transfer relay R530 is in its operated position. With the circuit arranged in this manner, the timing relay R210 cannot be operated after the third digit has been dialed by the toll operator. This facility enables the toll operator to refrain from dialing the final digit of a called subscriber directory number if the same is found to be busy, or in the event that the operator desires to hold the particular called line until she has obtained a connection with the particular calling subscriber, as is the case in a delayed toll call.

When the toll operator dials the final digit into the connector 200 the selected ringing signal is transmitted to the desired called subscriber. When the call is answered the ring cutoff slave relay R460 and the answer relay R320 are operated, in the manner previously described. The former relay, at its contacts 464', prepares a point in the time start circuit for the lower winding of the relay R210 but the answer relay R320, at its contacts 326, opens a further point in the time start circuit and thus prevents the relay R210 from operating to initiate conversation timing on calls extended by the toll operator.

In the case of single digit trunk calls by a regular subscriber the conversation timing facilities are operative to forcibly release the connection after a predetermined elapsed time interval in the same manner as has been described previously in the case of calls to subscriber lines. However, in the case of single digit trunk calls initiated by the toll operator the conversation timing facilities are rendered ineffective inasmuch as the control relay R360 is retained in its restored position.

While one embodiment of the invention has been disclosed, it will be understood that various modifications may be made therein which are within the true spirit and scope of the invention.

What is claimed is:

1. In a telephone system, subscriber lines, a finder switch having access to said lines and operable to find and connect with a calling line, an auxiliary terminal individual to each calling line engaged by said finder, a restriction service network including a plurality of relays, a terminal frame for interconnecting the auxiliary terminal individual to any line to any one of said relays or to different combinations of said relays thereby to impose a restriction or combination of restrictions upon the service rendered the associated subscriber line, a plurality of marking conductors, a like plurality of groups of trunks, a switch controllable from said calling line to select a desired group of trunks and an idle trunk in the selected group including means for causing said switch to pass over busy trunks in the selected group, a control circuit for artificially indicating to said switch that all of the trunks in a selected group are busy whether said trunks are actually busy or not, and means including normal post springs operated responsive to the selection of any group of trunks for controlling said network to mark said conductors in accordance with the restriction or combination of restrictions imposed on said calling line and for connecting the one of said marking conductors individual to said selected trunk group to said control circuit, said control circuit being rendered effective only when the connected marking conductor is marked by said network relays.

2. In a telephone system, a first group of lines having two different service restrictions imposed thereon, a second group of lines having a third service restriction imposed thereon, a plurality of groups of trunks certain of which are restricted, a link including a finder switch having access to said lines and a trunk hunting switch having access to said groups of trunks, service restricting means, a plurality of marking conductors, means in said link controlled from a calling line in said first or second group of lines for operating said finder switch to seize said calling line and for operating said trunk hunting switch to select a group of trunks, relay means in said service restricting means controlled by said seizure of a calling line in said first group of lines and by the operation of said trunk hunting switch to select a group of trunks for marking two of said marking conductors in accordance with said two different service restrictions, additional relay means in said service restricting means controlled by said seizure of a calling line in said second group of lines and by the operation of said trunk hunting switch to select a group of trunks for marking a third one of said marking conductors in accordance with said third service restriction, and means including normal post springs in said trunk hunting switch operated in accordance with a selected group of trunks for preventing said hunting switch from selecting any trunk in the selected group of trunks either in the event that the selected group of trunks is restricted and corresponds to either one of said two marked conductors and said calling line is in said first group of lines or in the event the selected group of trunks is restricted and corresponds to said third marked conductor and said calling line is in said second group of lines.

3. In a telephone system, a first group of lines having two different service restrictions imposed thereon, a second group of lines having a third service restriction imposed thereon, a plurality of groups of trunks certain of which are restricted, a link including a finder switch having access to said lines and a trunk hunting switch having access to said groups of trunks, service restricting means, a plurality of marking conductors, means in said link controlled from a calling line in said first or second group of lines for operating said finder switch to seize said calling line and for operating said trunk hunting switch to select a group of trunks, relay means in said service restricting means controlled by said seizure of a calling line in said first group of lines and by the operation of said trunk hunting switch to select a group of trunks for marking two of said marking conductors in accordance with said two different service restrictions, additional relay means in said service restricting means controlled by said seizure of a calling line in said second group of lines and by the operation of said trunk hunting switch to select a group of trunks for marking a third one of said marking conductors in accordance with said third service restriction, and a relay in said trunk hunting switch operated in accordance with a selected group of trunks for preventing said hunting switch from selecting any trunk in the selected group of trunks only in the event that the selected group of trunks is restricted and corresponds to a marked one of said marking conductors.

4. In a telephone system which includes a finder for connecting with subscriber lines and switching apparatus having access to different interoffice trunk groups and which is controllable from a subscriber line that is restricted from using one of said trunk groups; service restricting means, means controlled over said restricted subscriber line for operating said finder to connect said line to said switching apparatus and for operating said switching apparatus to select any one of said trunk groups, means responsive to the selection of said one trunk group for operating said service restricting means in accordance with the restriction imposed on said line, marking conductors corresponding respectively to each of said trunk groups, means controlled by the operation of said service restricting means for placing a predetermined marking condition on the one of said conductors corresponding to the one of said trunk groups which is restricted from use by said line, circuit control means corresponding respectively to each of said trunk groups, means responsive to the selection of one of said trunk groups for actuating the corresponding one of said circuit control means, and a relay operated responsive to the marking of one of said marking conductors matching the one of said circuit control means corresponding to the particular selected one of said trunk groups for transmitting a signal to said line.

5. In a telephone system, a plurality of trunks, a plurality of lines, restriction imposing means for restricting one or more of said lines from using one or more of said trunks, a link including a finder switch having access to said lines and a selecting switch having access to said trunks, a service restricting network, means responsive to a call on one of said lines for controlling said finder to find said calling line, means controlled over said calling line for thereafter operating said selecting switch to select one of said trunks, a first circuit including a terminal of said finder switch controlled each time said selecting switch is operated to select any one of said trunks for operating said network in accordance with the particular restriction imposed on said calling line by said restriction imposing means, a plurality of conductors corresponding respectively to each of said trunks extending from said network to said selecting switch, means in said network operated responsive to said control of said first circuit for marking one or more of said conductors in accordance with the particular restriction imposed on said calling line, a second circuit, means controlled by said selecting switch responsive to the operation thereof in an attempt to select a trunk restricted from use by said calling line for connecting said second circuit to the one of said conductors that corresponds to said selected trunk, means controlled in the event the conductor connected to said second circuit is marked by said network for completing said second circuit, and means including a relay operated responsive to the completion of said second circuit for preventing the seizure of said selected trunk.

6. In a telephone system, a plurality of trunks, a plurality of lines, restriction imposing means for restricting one or more of said lines from using one or more of said trunks, a link including a finder switch having access to said lines over associated contact banks and a selecting switch having access to said trunks over associated contact banks; means responsive to a call on one of said lines for controlling said finder to find said calling line, means controlled over said calling line for thereafter operating said selecting switch to select one of said trunks, first marking paths individual to each one of said lines having a restriction imposed thereon terminating in the contact banks accessible to said finder, second marking paths individual to the respective ones of said trunks, means controlled over the said first marking path individual to said calling line for marking one of said second marking paths in accordance with the restriction imposed on said calling line, means in said selecting switch operated in the event said calling line attempts to call one of said trunks restricted from use by said calling line for connecting the one of said second marking paths corresponding to the particular selected one of said trunks to said selecting switch, and a relay in said selecting switch operated in the event that the said selected trunk corresponds to the said marked one of said second marking paths for transmitting a busy signal to said calling line.

7. In a telephone exchange which includes switching apparatus having access to different groups of trunks and which automatically connects with calling lines that are to be restricted against the use of one or more of said groups of trunks; means controlled from a calling one of said lines for operating said switching apparatus to connect with said calling line and for operating said switching apparatus to select one of said groups of trunks, a plurality of conductors corresponding individually to said different groups of trunks, a service restricting means operated in accordance with the restriction imposed on said one calling line responsive to said selection of said one trunk group for applying a marking potential to one or more of said conductors, means including normal post springs actuated in response to the operation of said switching apparatus to select said one group of trunks for selecting the one of said marking conductors corresponding individually to said one group of trunks, additional means controlled by operation of said switching apparatus to select said one group of trunks for controlling said switching apparatus to search for and to seize, an idle trunk in said selected group, and a relay operated in response to the selection of said one marking conductor in the event said conductor is marked with a potential by said service restricting means for transmitting a signal to said one calling line and for preventing said additional means from seizing any trunk in said one group of trunks.

8. In a telephone exchange which includes switching apparatus controllable from calling lines to select any one of a plurality of groups of trunks and automatically operated to search for an idle trunk in a selected group; means controlled from a calling one of said lines for operating said switching apparatus to connect with said calling line and for operating said switching apparatus to select one of said groups of trunks, a service restricting network common to said exchange, marking conductors corresponding respectively to said groups of trunks, a control conductor individual to each of said lines, means in said switching apparatus controlled by said selection of said one group of trunks by said calling line for controlling said network over the one of said control conductors individual to said one calling line, additional means controlled by operation of said switching apparatus to select said one trunk group for controlling said switching apparatus to search for an idle trunk in said group, means responsive to the said control of said network for marking each of said marking conductors, and means including a relay in said switching apparatus controlled in response to the marking of the one of said marking conductors corresponding to said one trunk group for transmitting a busy signal to said one calling line whether or not idle trunks are available in said one trunk group.

PIER BAKKER.

REFERENCES CITED

The following references are of record in the file of this patent:

UNITED STATES PATENTS

| Number | Name | Date |
|---|---|---|
| 1,678,185 | Harper | July 24, 1928 |
| 1,834,649 | Saunders | Dec. 1, 1931 |
| 1,859,885 | Paine | May 24, 1932 |
| 1,891,423 | Kahn | Dec. 20, 1932 |
| 2,005,595 | Romme et al. | June 18, 1935 |
| 2,258,651 | Hovland | Oct. 14, 1941 |
| 2,311,214 | Crocker | Feb. 16, 1943 |
| 2,333,474 | Denton | Nov. 2, 1943 |
| 2,375,514 | Bakker | May 8, 1945 |
| 2,385,715 | Lomax et al. | Sept. 25, 1945 |
| 2,416,131 | Voss | Feb. 18, 1947 |
| 2,419,282 | Ostline | Apr. 22, 1947 |
| 2,490,221 | Lomax | Dec. 6, 1949 |
| 2,530,845 | Voss et al. | Nov. 12, 1950 |